United States Patent
Snowden et al.

(10) Patent No.: US 11,846,517 B2
(45) Date of Patent: Dec. 19, 2023

(54) VECTOR TILE NAVIGATION

(71) Applicant: Ordnance Survey Limited, Southampton (GB)

(72) Inventors: Oliver Snowden, Southampton (GB); Mark Freeman, Southampton (GB)

(73) Assignee: Ordnance Survey Limited, Southampton (GB)

( * ) Notice: Subject to any disclaimer, the term of this patent is extended or adjusted under 35 U.S.C. 154(b) by 247 days.

(21) Appl. No.: 17/229,177

(22) Filed: Apr. 13, 2021

(65) Prior Publication Data

US 2021/0325196 A1 Oct. 21, 2021

(51) Int. Cl.
*G01C 21/34* (2006.01)
*G01C 21/00* (2006.01)
*G01C 21/36* (2006.01)

(52) U.S. Cl.
CPC ....... *G01C 21/3461* (2013.01); *G01C 21/367* (2013.01); *G01C 21/3826* (2020.08)

(58) Field of Classification Search
CPC ............ G01C 21/3461; G01C 21/3826; G01C 21/367; G06T 3/40
See application file for complete search history.

(56) References Cited

U.S. PATENT DOCUMENTS

| | | | | |
|---|---|---|---|---|
| 7,957,894 B2* | 6/2011 | Wellmann | .......... | G01C 21/3446 701/428 |
| 2007/0179708 A1* | 8/2007 | Sekine | ................ | G01C 21/3446 701/532 |
| 2010/0262359 A1* | 10/2010 | Motoyama | .......... | G01C 21/3446 701/532 |
| 2012/0303263 A1* | 11/2012 | Alam | ................. | G01C 21/3632 701/410 |
| 2013/0147820 A1* | 6/2013 | Kalai | ................. | G01C 21/3889 345/522 |
| 2015/0377632 A1* | 12/2015 | Pfeifle | ................ | G01C 21/3815 701/532 |
| 2019/0128679 A1* | 5/2019 | Thompson | ......... | G01C 21/3881 |
| 2020/0058099 A1* | 2/2020 | Snowden | ............. | G06T 3/0056 |

OTHER PUBLICATIONS

Julien Gaffuri, Toward Web Mapping with Vector Data, Sep. 2012, European Commission—Joint Research Centre, pp. 90-92 (Year: 2012).*
EP Extended Search Report—Application No. 20169690.3 dated Feb. 19, 2021.

* cited by examiner

*Primary Examiner* — Redhwan K Mawari
(74) *Attorney, Agent, or Firm* — Banner & Witcoff, Ltd.

(57) ABSTRACT

A method and system for generating geographic routes using topographic data that has been transformed into vector tiles to enable large spatial networks to be reduced from large scale to small scale, wherein the networks are reduced based on the lowest cost path(s) across each vector tile (for example, shortest, fastest and/or safest route across the represented geographic area) whilst ensuring connectivity between adjacent vector tiles is maintained. Complex and vast networks can be simplified to the cost of moving across a single vector tile from edge to edge, with each zoom level comprising a plurality of vector tiles with varying levels of detail concerning the paths across each vector tile. Routes between two locations, particularly those covering large distances, can then be quickly and efficiently determined using the processed vector tiles.

14 Claims, 28 Drawing Sheets

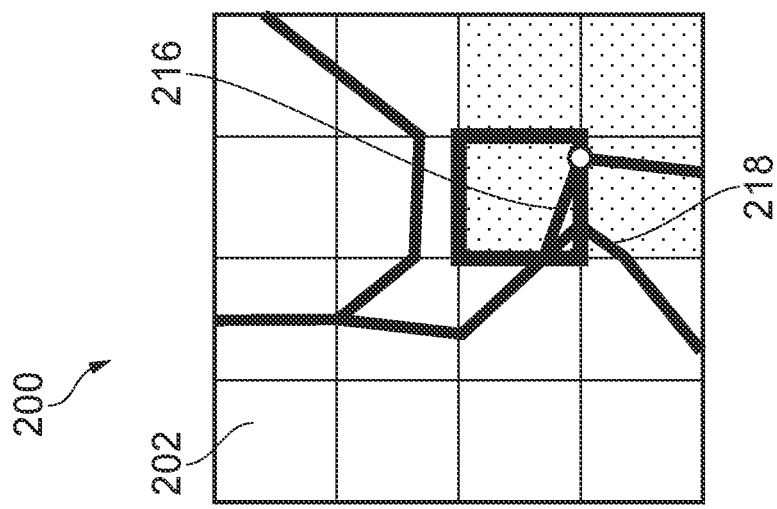
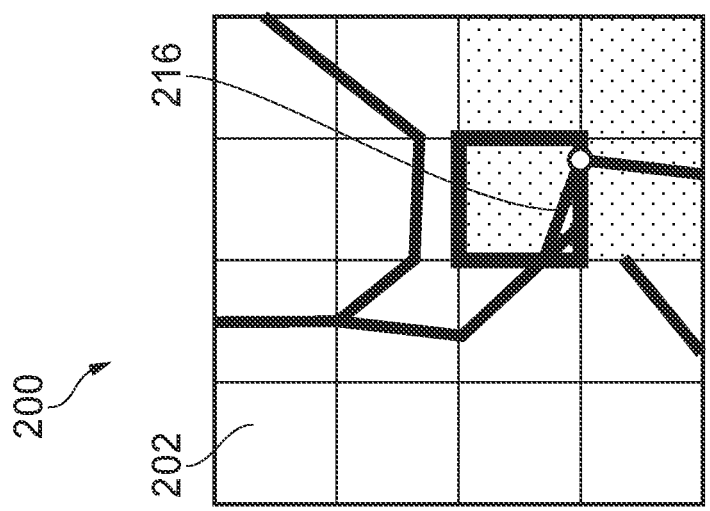
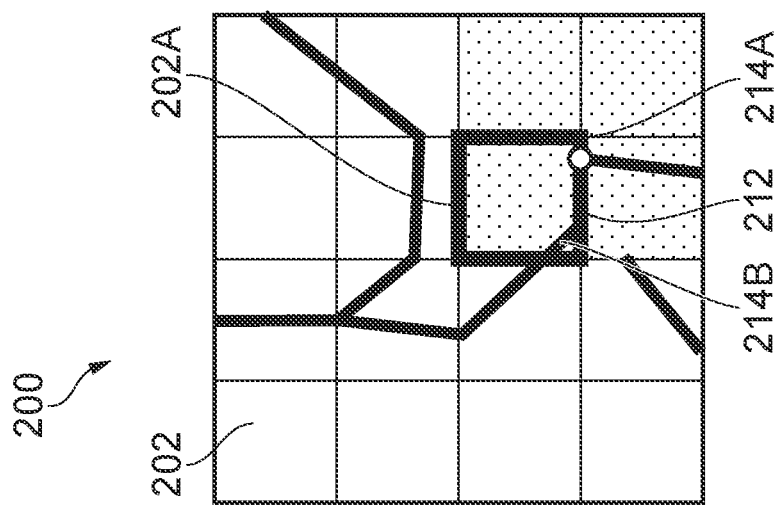

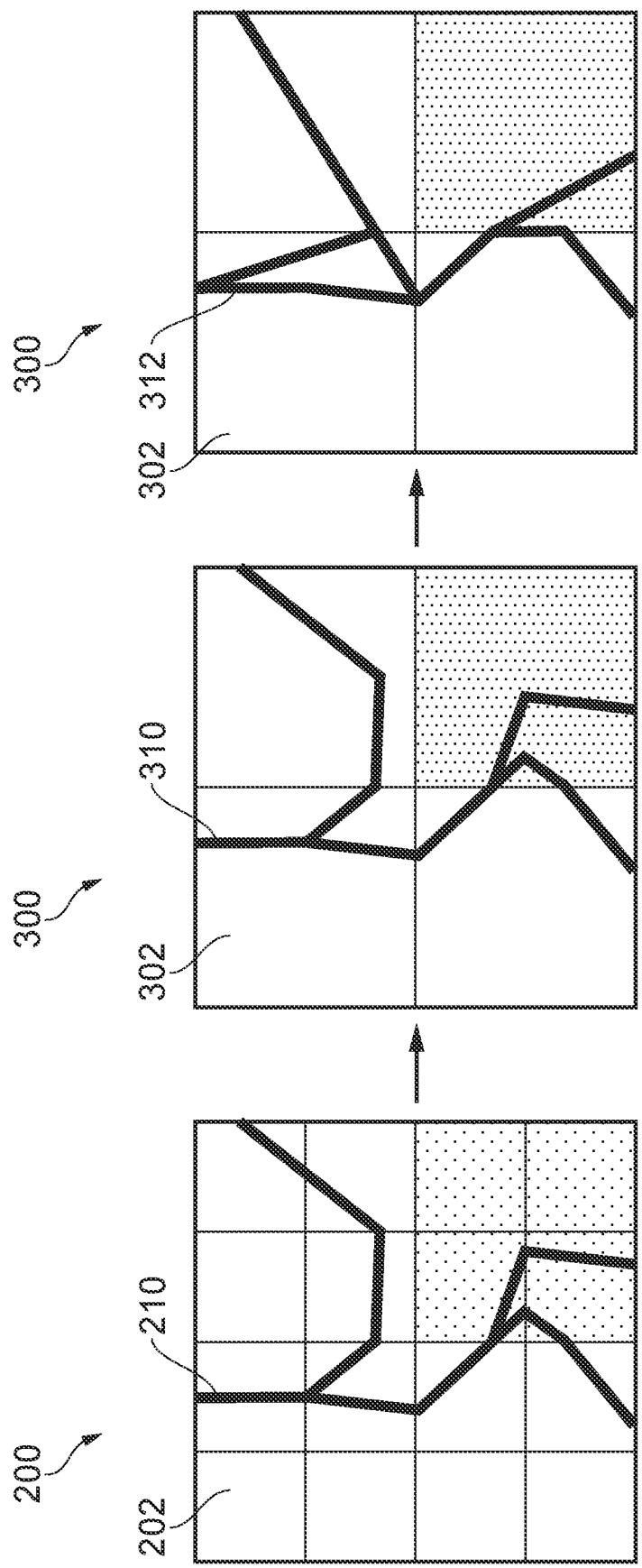

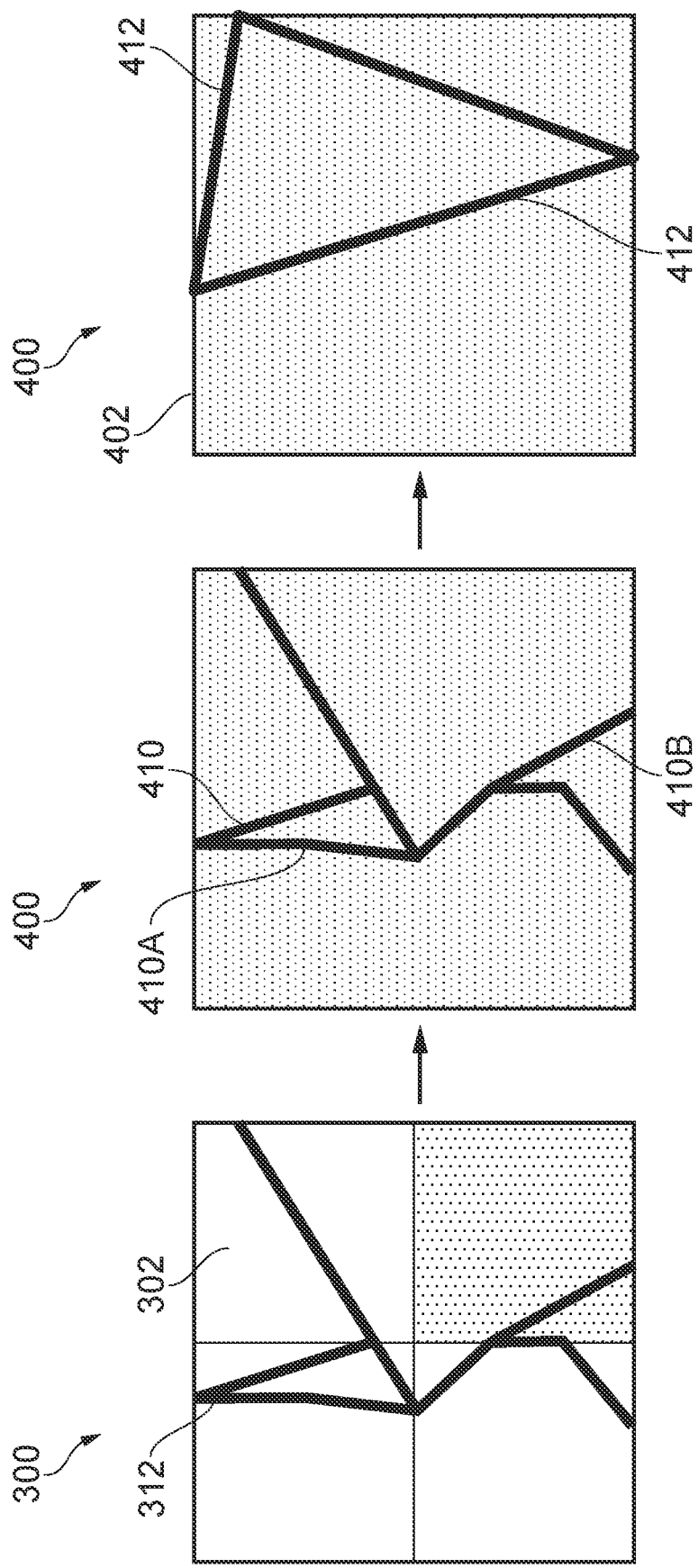

(d)
(e)
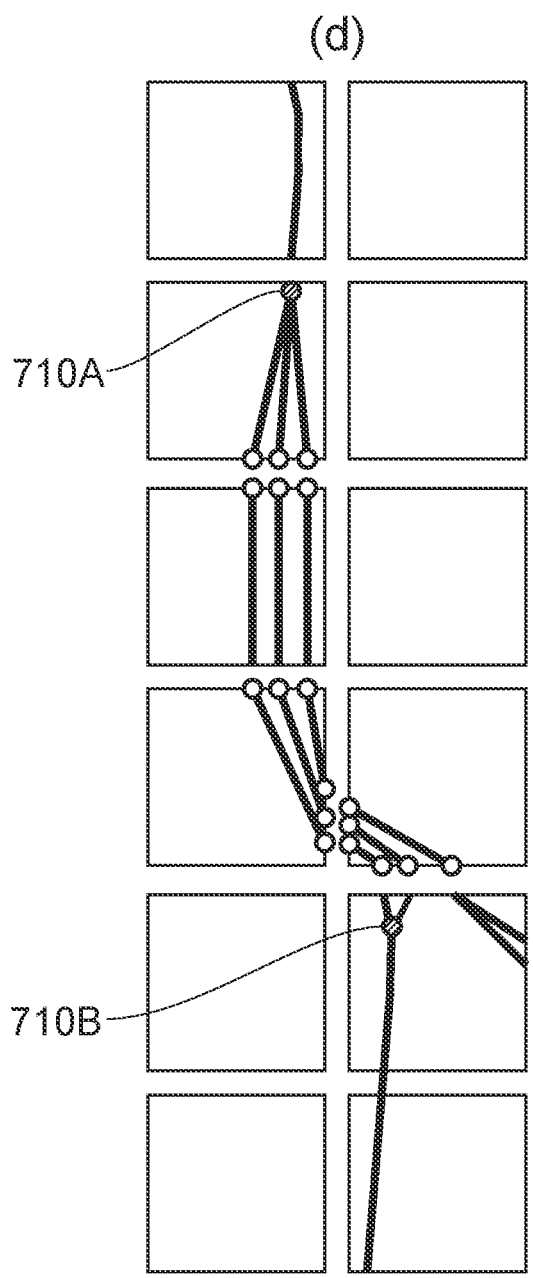
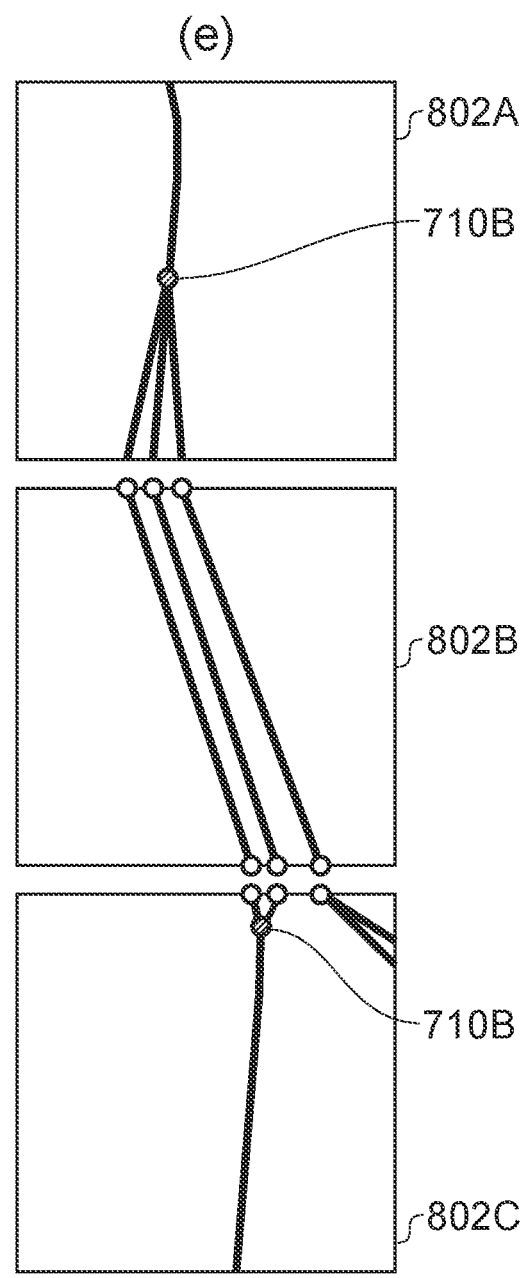
FIG. 8A
FIG. 8B

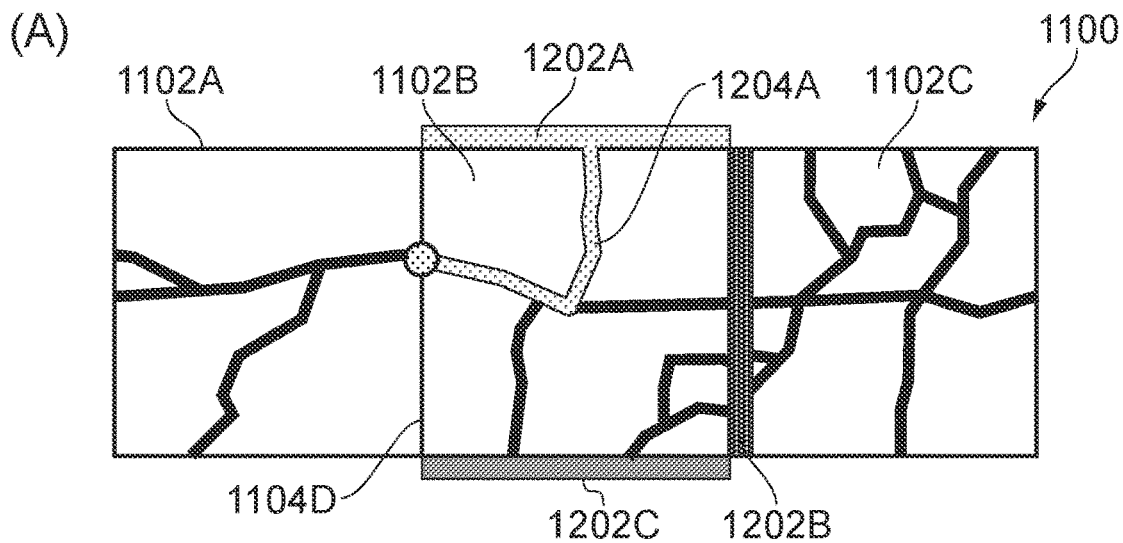
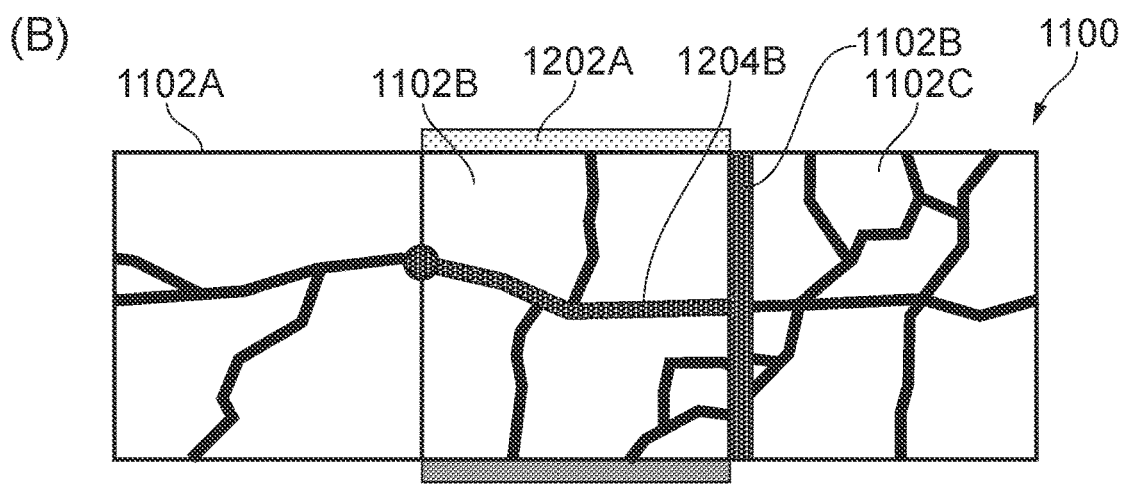
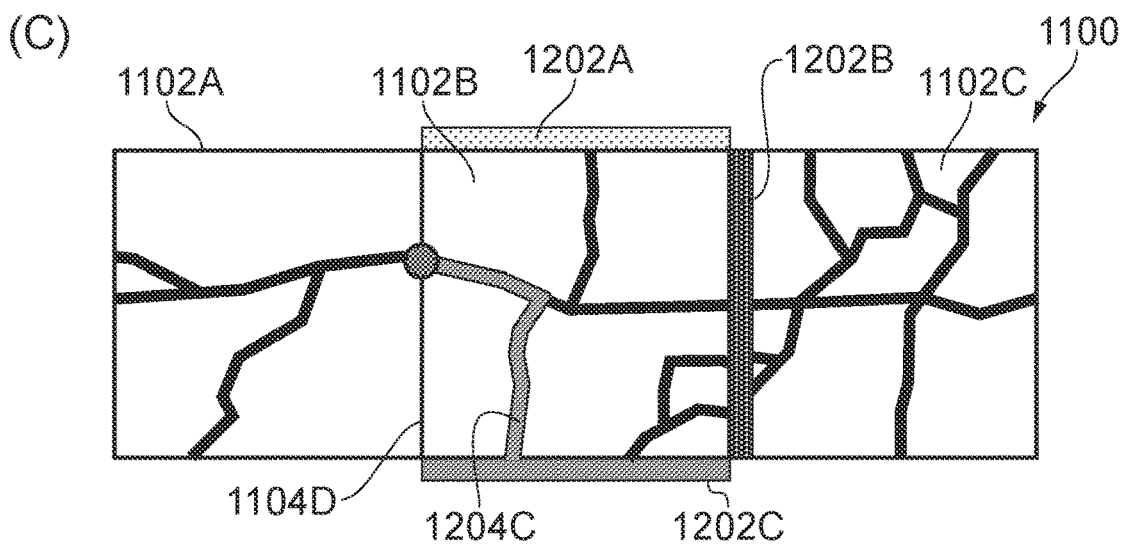
FIG. 12

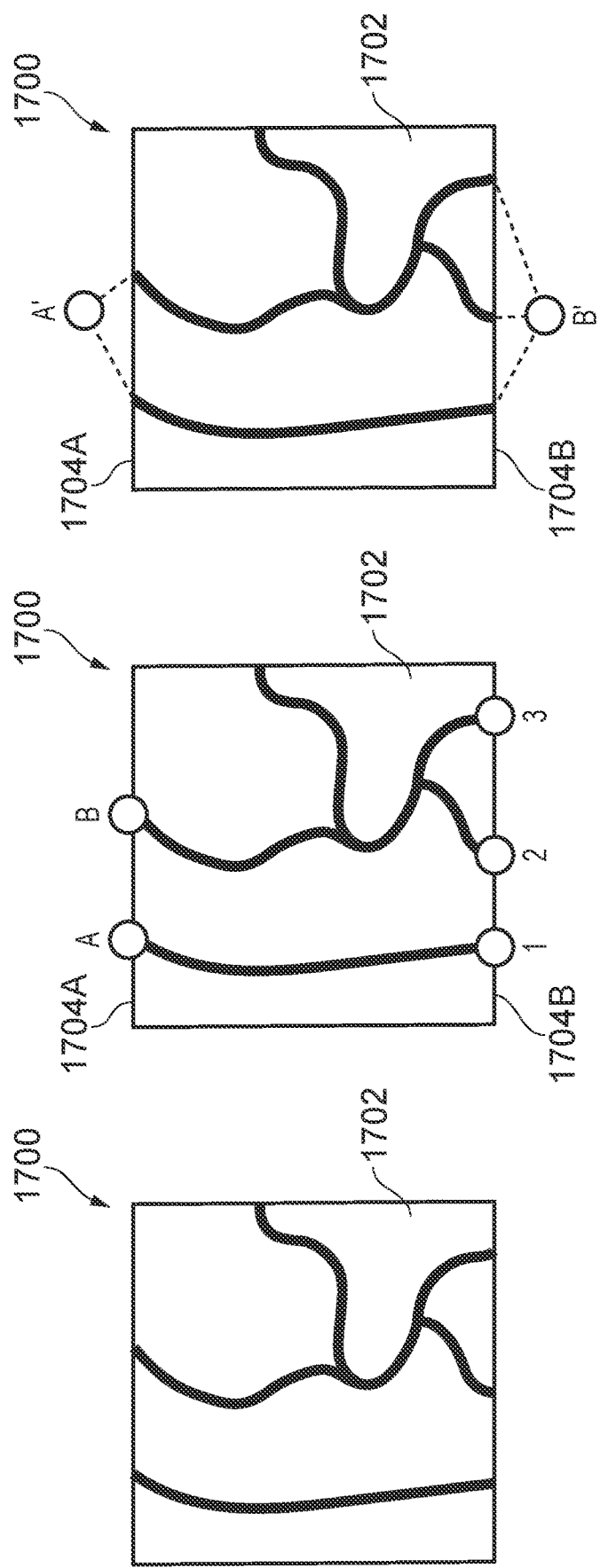

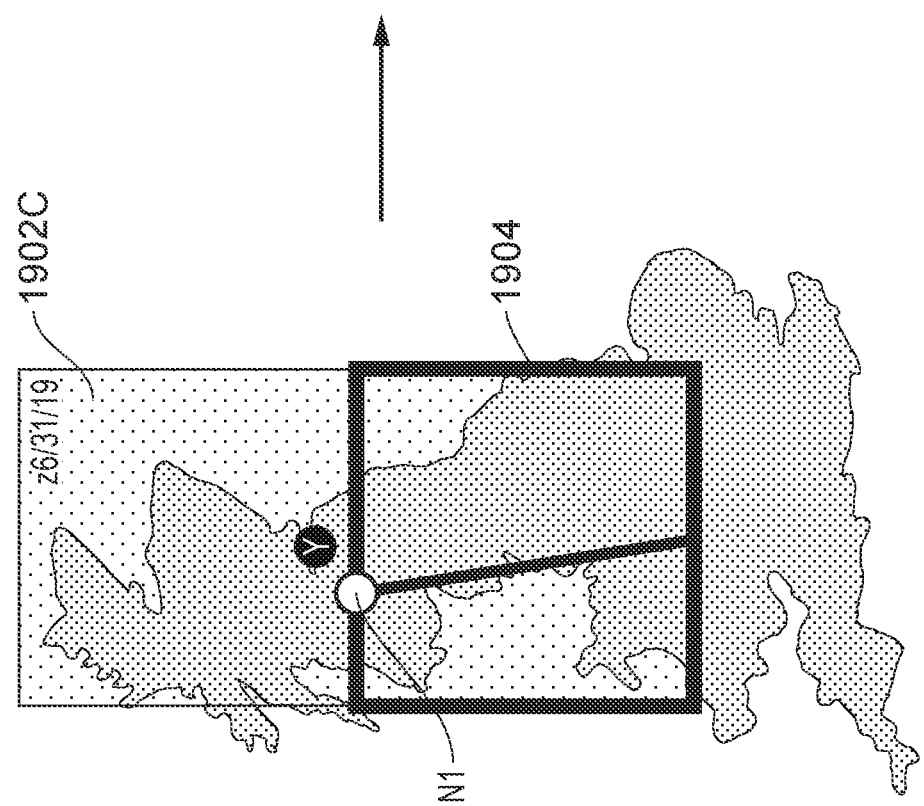
FIG. 21B
FIG. 21A

VECTOR TILE NAVIGATION

FIELD

Embodiments described herein relate to a computer-implemented method and system for generating geographic routes. In particular, one or more aspects relate to a computer-implemented method and system for generating geographic routes based on vector data that has been processed to enable geographic routes to be quickly determined without needing to process vast amounts of data.

BACKGROUND

The use of digital maps for planning routes between geographic locations has become increasingly more common place, and something that many use daily in their everyday lives. Most providers of digital maps rely on a very detailed topographical map database which stores the underlying data. For example, Ordnance Survey uses the very large scale topographic product OS MasterMap®, which records every feature larger than a few metres in one continuous map, and is constantly being updated. The OS MasterMap® product is composed of vector features, each of which has a feature type, geometry, and various feature attributes. It is commonplace to transform vector data, such as OS MasterMap®, into map fragments often known as 'tiles', which can be raster or vector representations. Each tile represents part of a geographic area, which are then used to render a map image.

As the travel networks spanning across geographic areas become increasingly vast and complex, computing routes across those networks becomes more computationally expensive due to number of nodes that need to be processed. Furthermore, whilst it is common place to use such networks for routing, most route calculation software does not also capture polygon data for generating the routes, and those that do are often error prone, costly and inaccurate. For example, a park may be modelled as polygon grass area, whilst walkways might be captured as both polygons and lines for a walking network, with only the walkways thus being considered in the route calculation. In doing so, walkable areas are ignored, resulting in some unusual or unduly long routes.

SUMMARY

Embodiments described herein address the above noted problems by providing computer-implemented methods and systems for generating geographic routes using topographic data that has been transformed into vector tiles to enable large spatial networks such as roads, walkways and the like to be reduced from large scale to small scale, wherein the networks are reduced based on the lowest cost path(s) across each vector tile (for example, the shortest, fastest and/or safest route across the represented geographic area) whilst ensuring connectivity between adjacent vector tiles is maintained. As a result, complex and vast networks can be simplified to the cost of moving across a single vector tile from edge to edge, with each zoom level comprising a plurality of vector tiles with varying levels of detail concerning the paths across each vector tile. Routes between two locations, particularly those covering large distances, can then be quickly and efficiently determined using the processed vector tiles. Firstly, lower resolution vector tiles at the smaller scale zoom levels are analysed to determine where there is network connectivity between those two locations. In doing so, only a small number of vector tiles need to be processed in the first instance to determine whether there is route between these two locations. The relevant high resolution vector tiles can then be processed to obtain the complete route.

A first aspect described herein provides a computer implemented method of generalising topographic data for use in route generation, the method comprising:
(i) obtaining a first topographic dataset relating to a geographical area, wherein the first topographic dataset comprises a first set of vector tiles at a first zoom level, each vector tile comprising one or more vector features having a geometry and one or more attributes associated therewith;
(ii) generating a first set of line vectors for the first set of vector tiles based on the geometry and/or attributes of the one or more vector features of the first topographic dataset, wherein each line vector of the first set of line vectors intersects a vector tile of the first zoom level and is connected to at least one line vector of an adjacent vector tile; and
(iii) generating a second topographic dataset relating the geographical are comprising a second set of vector tiles at a second zoom level of a smaller scale by applying a transformation function to the first set of vector tiles, wherein the transformation function generalises a first number of vector tiles in the first set of vector tiles to generate a single vector tile in the second set of vector tiles, and wherein the second set of vector tiles comprises the first set of line vectors.

As such, one technique described herein reduces the scale of vector features from a first zoom level to a second zoom level, wherein those vector features represent routes across the vector tiles, specifically, routes that represent the cheapest cost for crossing those vector tiles. In this respect, the cost of travelling across a route may take a number of different factors into account, such as the distance, speed limits, elevation, crime levels, driving difficulty, lighting, connectivity to satellite navigation systems and any other factor that may affect the suitability of a route. The first zoom level may correspond to the underlying topographic data at its highest level of data. The line vectors may then be generated based on the vector features, which are representative of objects such as road networks, walkways, areas of vegetation, buildings and the like. It will be appreciated here that the vector features may be a set of points, line features or polygon features. For example, the first topographic dataset may be a set of line features Likewise, the first topographic dataset may be a set of points that can then be constructed into lines or a graph. Similarly, it will also be appreciated that the line vectors may be two or three dimensional vectors. For example, a vector feature representative of a flight of stairs may be generalised to a line vector x, y and z components. As a result, the connectivity between vector tiles in the z direction may also be taken into consideration when determining the cheapest routes. The geometry and attributes of these vector features are then processed to identify whether those features can provide routes across vector tiles, and which of those routes are the cheapest. For example, two roads may extend between two edges of a vector tile as possible routes, but the road with the highest speed limit may be generalised to a line vector as this road provides the cheapest route between these two edges. The lines vectors are also generated such that they connect with other line vectors of adjacent vector tiles. For example, a road in one vector tile may be identified as the preferred route between two edges, but does not connect at those edges with the preferred routes of the adjoining vector tiles. Consequently, a different road within that vector tile may need to be generalised to a line vector to ensure connectivity with the preferred routes of the surrounding vector tiles. By processing the vector tiles in this way, a network of line vectors are generated that connect the vector tiles in the cheapest way, whilst maintaining connectivity. Aspects herein then reduce the scale of the topographic data in the first zoom level to a second zoom level having a lower level of detail, with only the line vectors generated in the first zoom level propagating up to the second zoom level. This reduces the amount of data at the second zoom level whilst preserving the information required for guaranteed routing across the geographic area.

A method may further comprise generating a second set of line vectors for the second set of vector tiles based on the first set of line vectors, wherein each line vector of the second set of line vectors intersects a vector tile of the second zoom level and is connected to at least one line vector of an adjacent vector tile. That is to say, once the second zoom level has been generated with the first set of line vectors, this first set of line vectors are generalised further to produce a new set of line vectors that represent routes across the vector tiles at the second zoom level. For example, four vector tiles at the first zoom level may be been reduced to a single vector tile at the second zoom level. Each vector tile in the first zoom level may have contained several line vectors connecting each other. At the second zoom level, these line vectors can then be generalised to a smaller number of line vectors extending from edge to edge of the single vector tile, again ensuring that those line vectors are connected to those in adjoining vector tiles. The vector tiles at the second zoom level can then be reduced to the next zoom level and the processed repeated again until the zoom level of the lowest level of required detail is reached.

As such, a method may further include generating a plurality of further topographic datasets relating to the geographic area, wherein each further topographic dataset comprises a new set of vector tiles at a new zoom level of reducing scale, and wherein each further topographic dataset is generated according to steps (ii) and (iii) above. That is to say, the process of generating line vectors and reducing to the next zoom level is repeated iteratively until the zoom level of the lowest level of required detail is reached.

Once all of the required zoom levels have been generated, these can be used to quickly and efficiently route over large distances by first identifying a coarse route using the line vectors and vector tiles at the smaller scale zoom levels and then using the corresponding vector tiles at the larger scale zoom levels to obtain the detailed route, for example, using the source topographic data.

Generating the first set of line vectors may further comprises identifying one or more vector features for each vector tile based on the one or more attributes associated therewith, wherein the identified vector features provide a candidate route for crossing the respective vector tile, and then further comprising generalising the geometry of the identified vector features to a plurality of line vectors. That is to say, the attributes of the vector features may first be used to identify candidate routes across the vector tiles. For example, for a network of roads, the lengths, speed limits, elevation of those roads, crime levels, driving difficulty, lighting, connectivity to satellite navigation systems and any other factor that may affect the suitability of a road may be used to identify those that represent the cheapest (i.e. the most preferred) routes across the vector tiles. The geometry of these candidate routes may then be generalised to line vectors, which puts them in a simpler form for reduction and reduces the amount of data needed to be processed when used for route generation.

A method may further comprise determining a set of cheapest routes across each respective vector tile from the plurality of line vectors to provide the first set of line vectors. In this respect, determining the set of cheapest routes may comprise identifying a line vector between respective edges of a vector tile providing the cheapest route between said edges. That is to say, the line vectors that represent the cheapest route between edges of a vector tile (for example, the cheapest route may correspond to the shortest, fastest and/or safest route) will be identified and used as the first set of line vectors. It will of course be appreciated that some vector tiles will not have a line vector between every respective edge (e.g. there are no roads crossing that edge).

Determining the set of cheapest routes across each respective vector tile may also comprise determining a connection with a cheapest route of an adjacent vector tile such that the pair of adjacent vector tiles are connected by a line vector. That is to say, when determining the cheapest routes across a vector tile, the surrounding vector tiles will be processed to ensure that those routes connect with the cheapest routes of the surrounding vector tiles. If a route between two edges does not connect with cheapest routes of the surrounding vector tiles, then it may need to be discarded and a new cheapest route identified.

A further aspect described herein provides a computer-implemented method of generating a route between a first geographic position and a second geographic position based on a plurality of topographic datasets, wherein each topographic dataset comprises a set of vector tiles at a different zoom level, each set of vector tiles comprising a set of line vectors, and wherein each line vector intersects a vector tile and is connected to at least one line vector of an adjacent vector tile, comprising identifying one or more candidate vector tiles at one or more zoom levels, wherein the one or more candidate vector tiles correspond to a geographic region between the first and second geographic positions, and processing the one or more candidate vector tiles to determine a route between the first and second geographic positions based on the line vectors of the one or more candidate vector tiles.

Using zoom levels of varying levels of detail, wherein each zoom level comprises a plurality of vector tiles with line vectors connecting adjacent vector tiles, routes over large geographic distances can be quickly and efficiently identified. Specifically, the line vectors of the smaller scale zoom levels, that is the low resolution vector tiles, can be used to identify a coarse route between the two geographic positions. Once the coarse route has been identified, the high resolution vector tiles can be processed to obtain the detailed route.

Identifying one or more candidate vector tiles at one or more zoom levels may further comprise identifying a first zoom level comprising a first set of candidate vector tiles for connecting the first and second geographic positions, and identifying one or more further candidate vector tiles from one or more further zoom levels, wherein the further candidate vector tiles correspond to at least a portion of the first set of candidate vector tiles at a larger scale.

Processing the one or more candidate vector tiles may then comprises processing the first set of candidate vector tiles to determine at least a first portion of a route between the first and second geographic positions based on one or more line vectors of the first set of candidate tiles, processing the one or more further candidate vector tiles to determine one or more further portions of a route between the first and second geographic positions based on one or more line vectors of the further candidate vector tiles, and generating a final route between the first and second geographic positions in dependence thereon.

That is to say, a first set of vector tiles, preferably at the lowest resolution possible, will be used to establish a coarse route that covers most of the distance between the two target locations. Further higher resolution vector tiles corresponding to the same geographic areas at the first set of vector tiles will then be considered to resolve any breaks in connectivity between the coarse route and the two target locations.

For example, the first set of candidate vector tiles for connecting the first and second geographic positions may be such that the first and second geographic positions are separated by a single intermediate vector tile having a first line vector extending in a direction of the first and second geographic positions, the first and second geographic positions being each within a vector tile adjacent to the intermediate vector tile. The method may then further comprise connecting the first line vector with the first and/or second geographic positions based on the one or more further candidate vector tiles, such that the first and second geographic positions are connected by the first line vector and one or more further line vectors.

As such, the line vector extending across the intermediate vector tile establishes a coarse route that covers most of the distance between the two target locations. At either end of this intermediate line vector, higher resolution vector tiles are then processed to identify line vectors that connect this intermediate line vector with the target locations, which together provide the general route between the two locations.

The final route can then be determined using these line vectors, for example, by identifying the highest resolution vector tiles corresponding to these line vectors and then using the source topographic data to obtain the detailed route. Similarly, higher resolution vector tiles corresponding to the intermediate vector tile may be processed to refine the intermediate line vector to refine this portion of the route.

The plurality of topographic datasets used for generating the route may be generated according to the method of the first aspect described above.

A further aspect described herein provides a system comprising a processor, and a computer readable medium storing one or more instruction(s) arranged such that when executed the processor is caused to perform any of the methods described above.

BRIEF DESCRIPTION OF THE DRAWINGS

Further features and advantages will become apparent from the following description of embodiments thereof, presented by way of example only, and by reference to the drawings, wherein:

FIGS. 2A-2E illustrate an example of the processing described herein;

FIGS. 3A-3C illustrate an example of the processing described herein;

FIGS. 4A-4C illustrate an example of the processing described herein;

FIGS. 8A-8B illustrate a further example of the processing described herein;

FIG. 12 further illustrates an example of the processing described herein;

FIG. 17A-E illustrate a further example of the processing described herein;

FIGS. 21A-B further illustrate an example of the route generation described herein;

DETAILED DESCRIPTION

Figure 1:
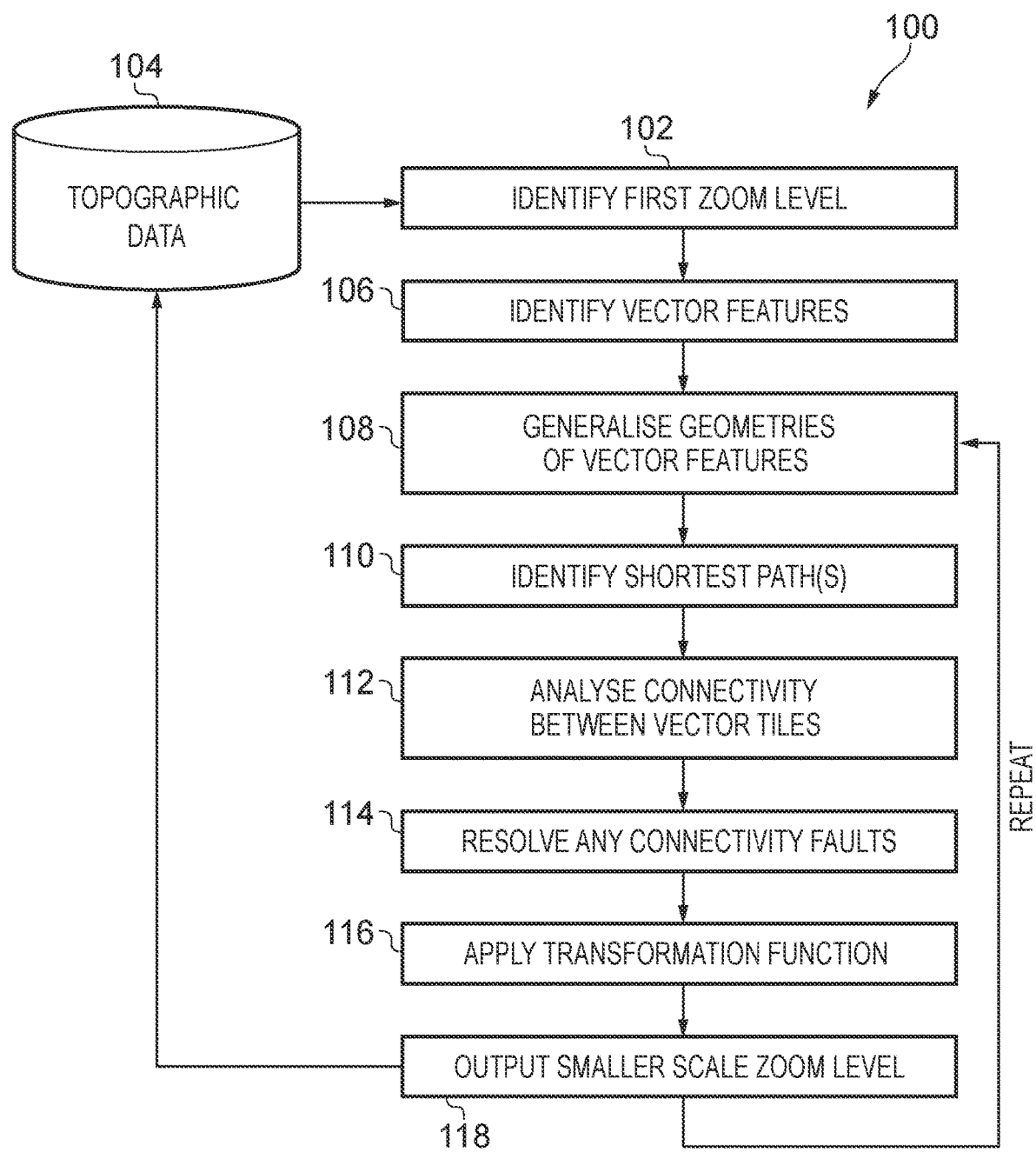
FIG. 1 is a flow diagram illustrating a method of processing topographic data according to one or more illustrative aspects described herein.

In digital mapping, image pyramiding is a known way of producing a map image of a geographic area at several zoom levels of varying detail. The image pyramid will comprise several layers each representing the same geographic area at a different zoom level. The first layer may be the original map image generated by the underlying topographic data stored in the map database and thus shows all of the topographic features of that geographic area in the highest level of detail available. To create the next layer up, for example, at half the resolution, a subsample of the image tiles in the first layer may be taken and mosaicked together in some way. The same can then be repeated to create the next layer, for example, at a quarter of the resolution of the first layer, and so on until the smallest scale required is reached. For every zoom level of the pyramid created, the amount of storage space required increases, and the visual quality of the resulting image is not always guaranteed since the quality of each level relies on the resolution of the levels lower down in the pyramid.

An alternative form of pyramiding is to process each zoom level as a plurality of vector tiles, with each tile being representative of a geographic area and comprising one or more vector features that are representative of objects within that geographic area, such as buildings, roads, rivers, vegetation and the like, and other information related to that geographical area, such as weather and climate data, crime rates, population data or any other information that can be used to describe a region of the Earth. In this respect, it will be appreciated that the vector features may be line features or polygon features. To reduce a zoom level to a smaller scale, a number of vector tiles are merged together according to some suitable transformation function, which reduces the vector features in those vector tiles to the required scale according to their geometry, feature type and attributes. In doing so, important topographic information about those vector features is not lost each time the map scale is reduced. Similarly, the process enables a user to retain specific information and effectively filter out information that is not of interest or use.

As will be described in more detail below, this type of vector tile pyramiding can be used to reduce the amount of processing required to calculate geographic routes between two locations, particularly for finding geographic routes between locations that are very far apart and thus have a vast and complex network of roads, walkways and the like therebetween. Furthermore, as this processing takes the attributes of the vector features into account when determining the lowest cost route (i.e. the preferred route) across each tile, such as changes in elevation, speed limits, driving difficulty, lighting, crime rates and connectivity to satellite navigation systems, and allows for polygon features that are not always included by route generation software, such as parks, carparks, shopping centres, or anything that is not classified as a walkway or road.

FIG. 1 shows a method 100 of processing vector tiles for use in route generation.

To begin, the first zoom level of a geographic area is identified (step 102) based on topographic data stored in a topographic map database 104. As such, the first zoom level is that which describes the geographic area at its highest level of detail, and which would generate a map image of the geographic area at its largest possible scale.

Each zoom level is made of a plurality of vector tiles representing a part of the geographic area, each vector tile being of equal pixel size, for example, each tile may be 256×256 or 4096×4096, and containing a plurality of vector features that represent features of that geographic area. It will be appreciated that the pixels of each vector tile may be two-dimensional or three-dimensional. Whilst the data size of each tile may be the same, as this enables processing systems to have predictable processing times, the ground area that each tile covers may vary depending on the shape. For example, in a spherical or ellipsoid projection the tiles would cover a different amount of land depending on latitude. However, vector tiles that tessellate easily, such as square vector tiles, may be preferable to reduce complexity. Each vector feature represents a real-world object, or some other feature or aspect of that geographic area, and has geometry, a feature type, and various feature attributes. For example, a vector feature representative of a hospital may comprise geometry describing the area which it covers, a feature type of "building", as well as various attributes such as number of exits, number of levels, number of rooms, age and any other information about the hospital that may be embedded within the vector feature. Similarly, a vector feature representative of a road may be represented simply as line, with the feature type "road", as well as attributes such as speed limit, surface material, number of lanes, lighting, number of accidents and any other information about the road.

At step 106, each vector tile is then processed to identify vector features that provide a route across the vector tile, and that are good candidates for providing the lowest cost path (e.g the shortest, fastest and/or safest). In this respect, both line features such as roads and walkways, and polygon features will be considered. For some vector tiles, there will be no possible routes across the tiles, for example, they represent a body of water, and will therefore not be processed any further. For those vector features identified as possible routes across the vector tiles, the geometries of the vector features will be generalised (s. 108) such that the lowest cost path(s) from edge to edge can identified (s. 110). For example, roads and walkways may be generalised to straight lines or some other suitable geometry according to their length, change in elevation, speed limit and any other attribute or that may be factored in to calculating the cost of taking that path. Likewise, polygon features may be generalised such that they undergo a process of "skeletonization", the polygons being generalised to a skeleton representation, for example, a centreline within the polygon.

Methods by which the cheapest routes may be identified will be described in more detail below.

Once one or more cheapest paths across each vector tile have been identified, the connectivity between neighbouring vector tiles is analysed to ensure that connectivity between adjacent vector tiles is maintained (s. 112). In this respect, the vector tiles will be analysed to assess how the cheapest path(s) across each vector tile connect with the paths of adjacent vector tiles, and whether there any faults in the connectivity that need to be resolved (s. 114).

For example, a fault may be identified where a node of a cheapest path in one vector tile does not connect to any another path on the adjacent vector tile. Likewise, a fault may be identified where a node of a cheapest path in one vector tile connects to another path in the adjacent vector tile that is not representative of the cheapest path to in that adjacent tile. In such cases, one or more of the affected vector tiles may need to be processed further to resolve the fault in some way, examples of which will be described in more detail below.

Once all of the vector tiles have been processed to identify the cheapest routes available over the geographic area, a suitable transformation function will be applied to the paths of two or more vector tiles to reduce the geometries of those paths to the level of detail required (s. 116). For example, sets of 4×4 vector tiles may be merged together, with the geometries of any paths crossing those four vector tiles being generalised and reduced to a lower level of detail. The transformation function may employ one or more cartographic generalisation techniques in order to reduce the scale of the geometry of the identified paths, which may include, for example, aggregating paths, combining paths, simplifying paths, selecting certain paths, eliminating certain paths and/or merging paths.

Once the vector tiles have been merged together as required, a new smaller scale zoom level comprising the new vector tiles at the reduced scale is output (step 118).

To produce the next zoom level, steps 108-116 can be repeated to identify the cheapest path(s) across the vector tiles and then merging the vector tiles together with those paths being generalised and reduced, until the zoom level with the lowest level of required detail is reached.

The resulting zoom levels can then be used for quickly analysing the connectivity between points over large distances since only a small number of vector tiles between the two geographic locations need to be resolved in the first instance. Once the coarse route is established from the lowest scale zoom level, higher resolution tiles can then be identified and the cheapest routes between the start and end locations can be determined. This will be described in more detail below.

If any new topographic data is received, or the existing topographic data is updated, for example, a new road is built or an existing road is closed or under construction, the relevant vector tiles will be processed according to steps 101-118 to ensure that any changes to the network of cheapest paths as a result of this new or updated topographic data are propagated through the zoom levels.

A first example of the processing described in FIG. 1 will now be described with reference to FIGS. 2A-2E, 3A-3C and 4A-4C.

Figure 2B:
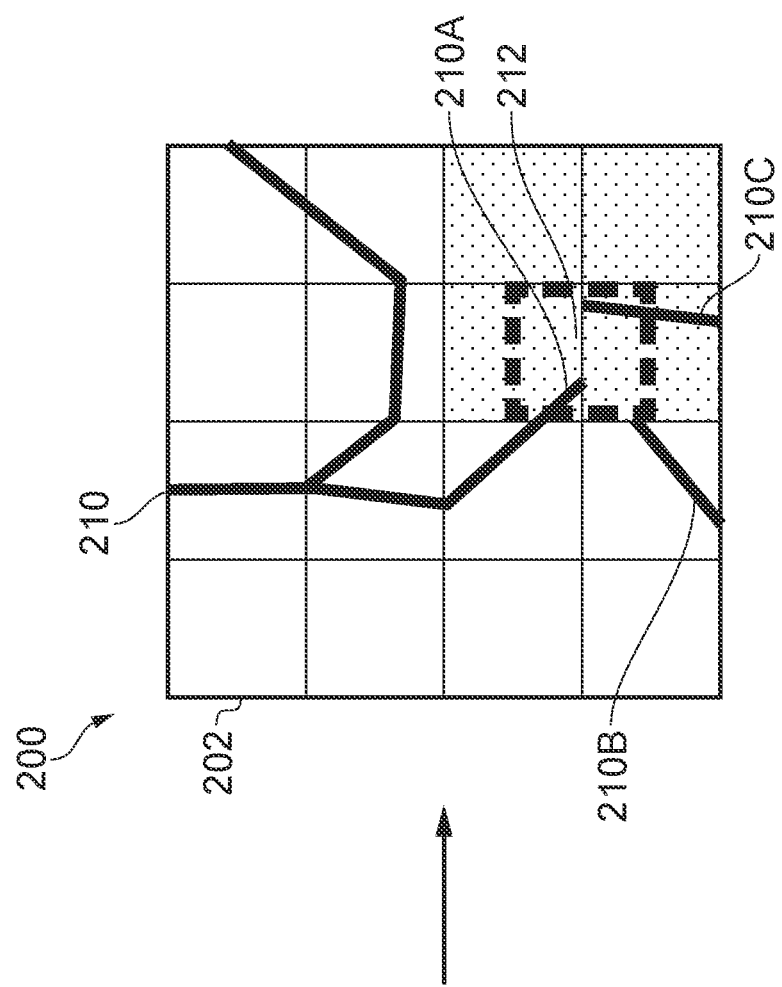
Figure 2A:
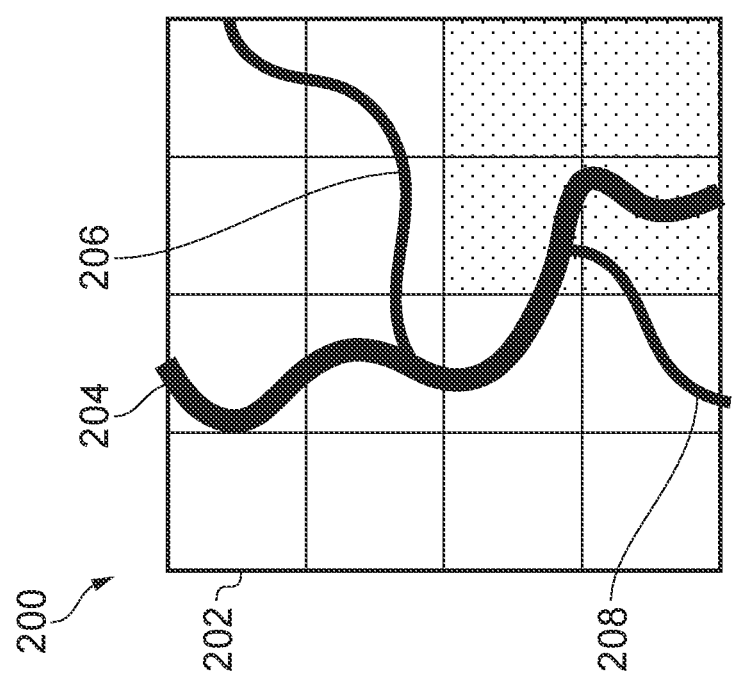

FIG. 2A shows a first geographic area at a first zoom level 200, the first zoom level comprising a plurality of vector tiles 202. In accordance with step 106 above, the vector features that provide a route across the vector tiles and are candidates for the lowest cost paths are identified as line features 204, 206 and 208. For example, the line features 204, 206 and 208 may be a walking network of sidewalks, paths and the like. In this example, line feature 204 is shown as a thicker line to indicate a path that is significantly lower cost (i.e. shorter/faster), for example, because it has a low change in elevation or has a higher speed limit.

As shown in FIG. 2B, the geometries of the line features 204, 206 and 208 are then generalised, in accordance with step 108, such that each vector tile 202 comprises one or more line vectors 210 extending from edge to edge and representing the lowest cost paths across the vector tiles 202 (step 110). As will become apparent from the description below, when generalising line features, it may be necessary to first consider the line features and junctions of the surrounding vector tiles before certain line features can be discarded as not providing the lowest cost path between two tile edges.

Whilst the present example illustrates these vectors as lines, it will be appreciated that these may be stored as edge to edge values. In this respect, these values may be coordinates, or by assigning the nodes at each edge a unique ID number. Assigning the vector tile nodes at each zoom level with a unique ID number can help to discriminate between nodes since coordinates will eventually begin to merge as the vector tiles are reduced.

The vector tiles 202 are then processed to analyse the connectivity of the line vectors 210 between adjacent vector tiles 202 (step 112). In this example, it can be seen that there is no connectivity between the line vectors 210A, 210B and 210C at the edge 212.

To resolve breakages in connectivity (step 114), a sweep operation can be performed, as illustrated by FIGS. 2C-2D. For each vector tile 202, the tile boundary is analysed to identify any neighbouring termination points that connect to unconnected nodes. For example, the neighbouring termination points on the tile boundary 202A are analysed to determine whether they can be connected to the unconnected nodes 214A, 214B on the edge 212. Using the source data, that is, the line features 204, 206 and 208, the sweep looks for neighbouring termination points on each relevant tile boundary and routes those termination points to the unconnected nodes 214 to derive new line vectors 216, 218 between those points. It will of course be appreciated that the sweep operation may be implemented in any suitable way so as to process unconnected nodes at each tile boundary.

Once the vector tiles 202 have all been processed such that the lowest cost paths have been identified, with each path being connected at the tile boundary to a path in the adjacent vector tile 202, the vector tiles 202 can be reduced to the next zoom level (step 116 and 118), as illustrated by FIGS. 3A-3C. FIG. 3A illustrates the first zoom level 200 with all of the low cost paths identified as a plurality of line vectors 210. A transformation function is then applied to the vector features of two or more vector tiles 200 (step 116) to reduce those vector features to a lower level of detail. In this example, four vector tiles 202 are reduced to a single vector tile 302 to produce a second zoom level 300 (step 118), as shown in FIG. 3B, such that the scale of the line vectors 210 is reduced by a factor of 4. The transformation function may reduce the line vectors 210 in the first zoom level 200 in any suitable way as described previously.

Once the second zoom level 300 has been generated with a reduced set of line vectors 302, the line features 302 are once again generalised to identify the cheapest paths 312 from edge to edge, as shown in FIG. 3C. As shown by FIGS. 4A-4C, this second zoom level 300 can then be reduced again by applying the transformation function to produce a third zoom level 400 comprising a single vector tile 402 having the lowest level of detail required. The reduced vector features 410 of the third zoom level 400 are then generalised again to the lowest cost paths 412 from edge to edge. When generalising the reduced vector features 410, the cost of individual path segments may be aggregated in order to help maintain accurate costs at each level. For example, two path segments 410A, 410B having a cost of 5 and 10 miles respectively may be generalised as a single path 412A with a summed cost of 15 miles. This summed cost may be recorded as an attribute of the vector feature 412A.

Figure 5:
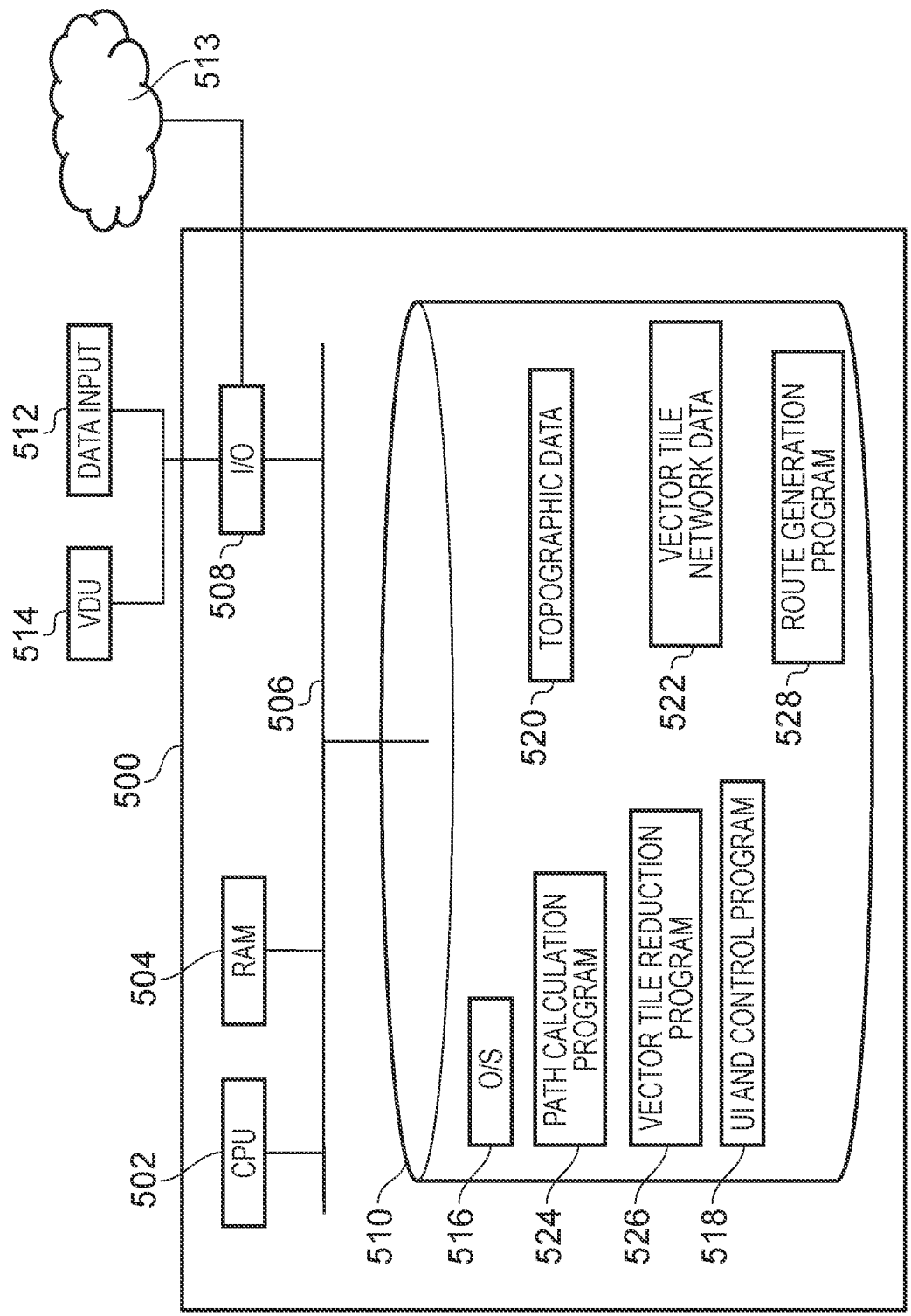
FIG. 5 is a block diagram illustrating a computer system on which one or more illustrative aspects described herein may be implemented.

FIG. 5 illustrates an example of a general computer system 500 that may form the platform for one or more aspects described herein. Generally, the system 500 described below implements the method described in detail above with reference to FIG. 1, and with reference to FIG. 18 below, and reference should be made to the above when considering the various steps and processes described below.

The computer system 500 comprises a central processing unit (CPU) 502 and a working memory 504, connected by a common bus 506, and having an input-output (I/O) interface 508 arranged to receive control inputs from a user via a device connected to a data input port 512 such as a keyboard, mouse, or other controller, and provide output information via a user interface which is displayed on an device having a visual display unit 514 such as a computer screen, television, mobile device or any other device capable of providing a visual display.

The computer system 500 is also provided with a computer readable storage medium 510 such as a hard disk drive (HDD), flash drive, solid state drive, or any other form of general-purpose data storage, upon which stored data and various programs are arranged to control the computer system 500 to operate in accordance with the various aspects described herein. For example, stored on the computer readable storage medium 510 is an operating system program 516 that when run by the CPU 502 allows the system to operate. Also provided is a path calculation program 524, a vector tile reduction program 526 and a route generation program 528 which together implement the various aspects described herein when run by the CPU 502, as will be described in more detail below. In order to interface with the path calculation program 524, vector tile reduction program 526 and route generation program 528, a user interface and control program 518 is also provided, that controls the computer 500 to provide a visual output to the VDU 514, and to receive user inputs via a keyboard, or another peripheral such as a mouse connected to the data input port 512, in order to control the path calculation program 524, vector tile reduction program 526 and route generation program 528. It will also be appreciated the data may be input or output via a network 513 in communication with one or more third party servers (for example, a server on which a user's device is running).

Input data upon which path calculation program 524, vector tile reduction program 526 and route generation program 528 operates includes topographic data 520 stored on the computer readable storage medium 510, as well as data input to the computer system 500 received via the data input port 512. Such data may include instructions identifying two geographic locations between which a route is required.

The path calculation program 524 and vector tile reduction program 526 use the stored topographic data 520 to pre-process the vector tiles as described above to thereby establish the lowest cost routes across the vector tiles at each zoom level. In this respect, the topographic data 520 comprises all of the vector features including their geometry, feature type and attributes.

Firstly, the path calculation program 524 is configured to process the topographic data 520 of the first zoom level as a plurality of vector tiles, as described above with reference to steps 106 to 114. Specifically, the path calculation program 524 identifies the vector features that provide a route across each vector tile, and then processes these vector features to find the lowest cost route from edge to edge, whilst maintaining good connectivity with the adjacent vector tiles. The lowest cost routes across each vector tile at this zoom level may then be stored as vector tile network data 522 for use by the route generation program 528. Once the lowest cost routes have been identified and any breakages in connectivity have been resolved, the vector tile reduction program 526 is then configured to apply a transformation function to the vector tiles according to the scale required. Once the vector tiles have been reduced in scale according to the transformation function and a new zoom level generated, the path calculation program 524 will repeat the process for the vector tiles at this new zoom level, and so on until the geographic area has been processed as vector tiles at every required zoom level. The vector tile network data 522 will comprise data indicative of the lowest cost routes across each vector tile at each zoom level.

The route generation program 528 is then configured to calculate routes between two geographic locations based on the vector tile network data 522 for output to a user, for example, via the visual display unit 514. Upon receiving user instructions via the data input 512 comprising start and end destinations, the route generation program 528 will use the vector tile network data 522 to route between those two locations, starting with the vector tiles at the lowest level of detail. By starting with the lowest scale zoom level, the route generation program 528 only has to process a small number of vector tiles between the two geographic points to determine whether those points are connected and to determine the general location of the network connecting those two points. This is particularly effective for routing over large distances. Once the coarse route is established, higher resolution tiles within those low scale vector tiles can be identified and processed to determine the route in a higher level of detail.

It will also be appreciated that one or more of the programs described above may be implemented on separate computing systems.

Figure 6A:
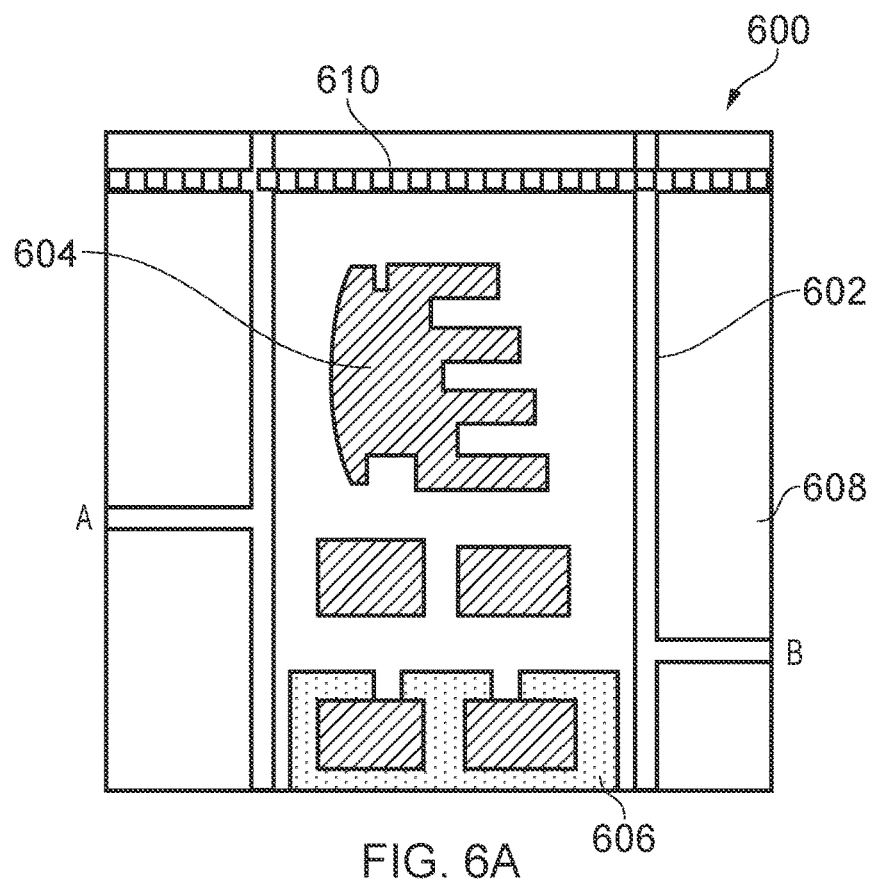
FIGS. 6A-6D illustrate a further example of the processing described herein.
Figure 6B:
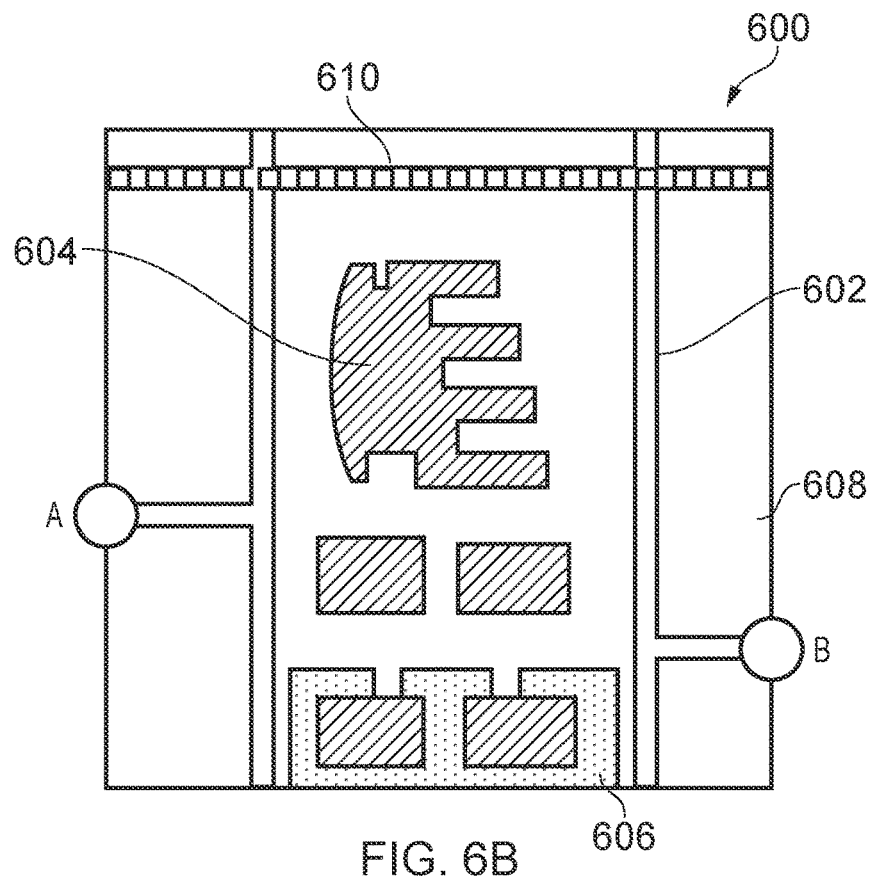
Figure 6C:
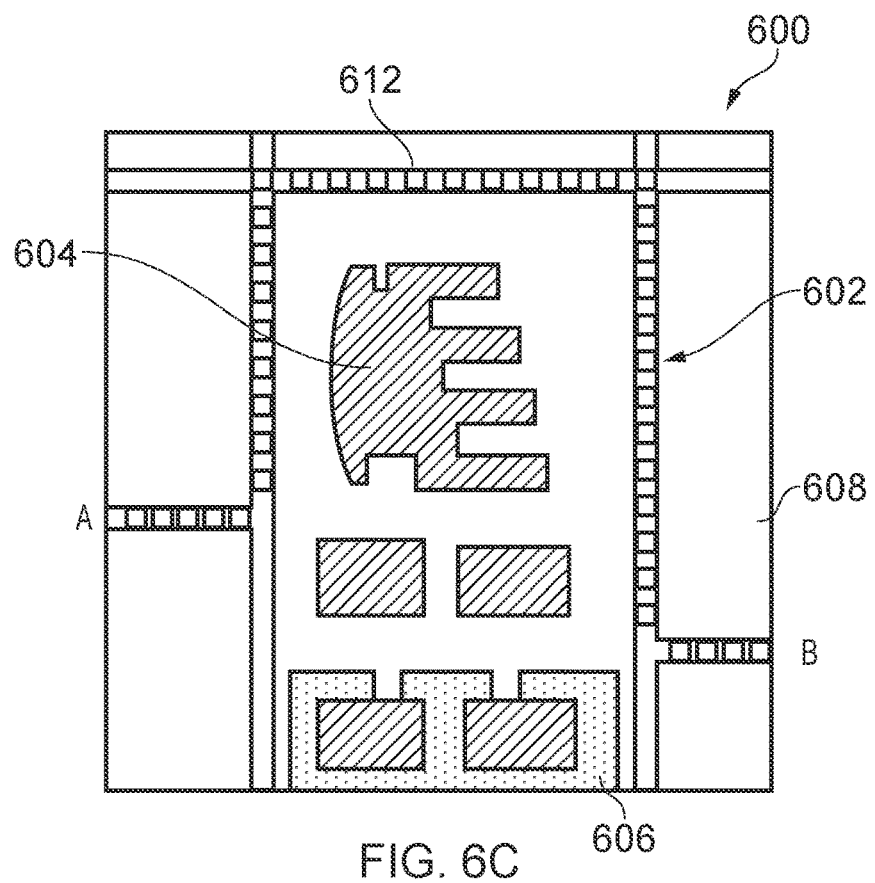
Figure 6D:
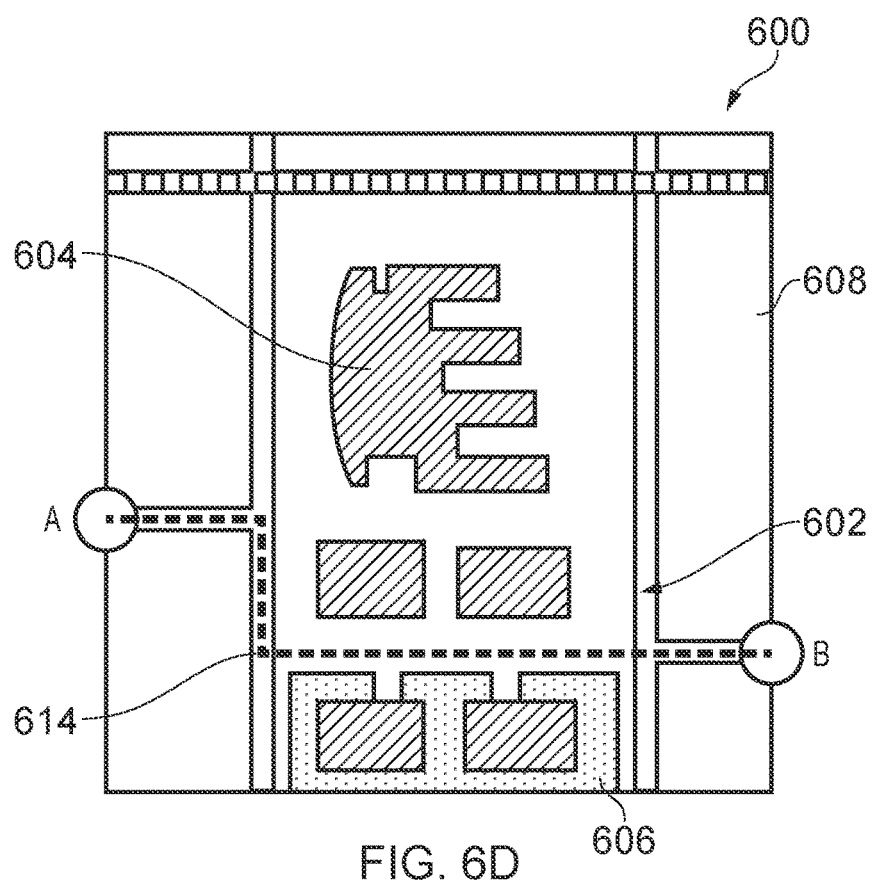

FIGS. 6A-6D illustrate a further pre-processing technique in which vector tiles are broken down into polygon geometry so that all features are taken into account, not just the road networks. Source geometry such as polygon features typically contain vast amounts of information useful for routing. It is common for polygon and network data to be separated and processed independently, which often results in disjointed data that may not accurately reflect reality. FIG. 6A shows a vector tile 600 comprising polygon geometry, including road features 602, building features 604, vegetation 606 and grassed areas 608. When processing the lowest cost path from edge to edge, the initial sweep will favour walkways and identify road feature 610 as the cheapest path. The second sweep then considers the neighbouring vector tiles, and identifies points A and B as being connected to the lowest cost paths on the adjacent vector tiles, as shown in FIG. 6B. If only the network data was considered, the lowest cost path 612 would be routed around the road features 602 from A to B, as shown in FIG. 6C. However, by taking the other polygon data into consideration, a lower cost route 614 is identified that crosses a grassed area 608 instead. It will be appreciated that the method of travel will also be taken into consideration (e.g. by foot, by road vehicle, etc.) and multiple sets of pre-processed vector tiles for different methods of travel may be generated.

It will also be appreciated that there are a number of different ways by which polygon geometry may be transformed into "networks" for use in identifying the lowest cost route from edge to edge, such as Delaunay triangulation, centreline extraction and the like.

Figure 7A:
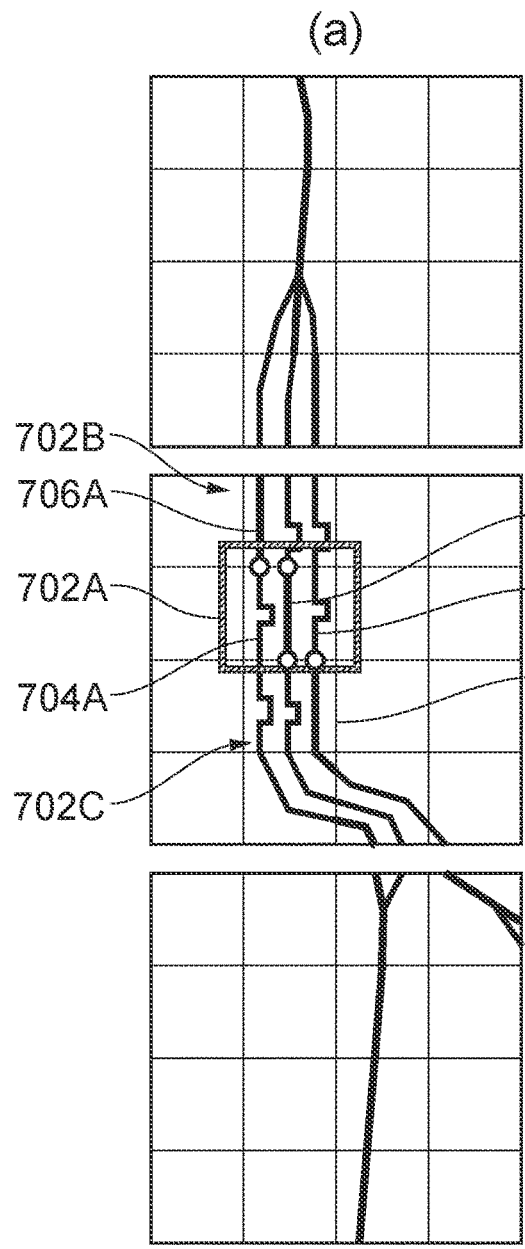
FIGS. 7A-7B illustrate an example of the processing described herein.
Figure 7B:
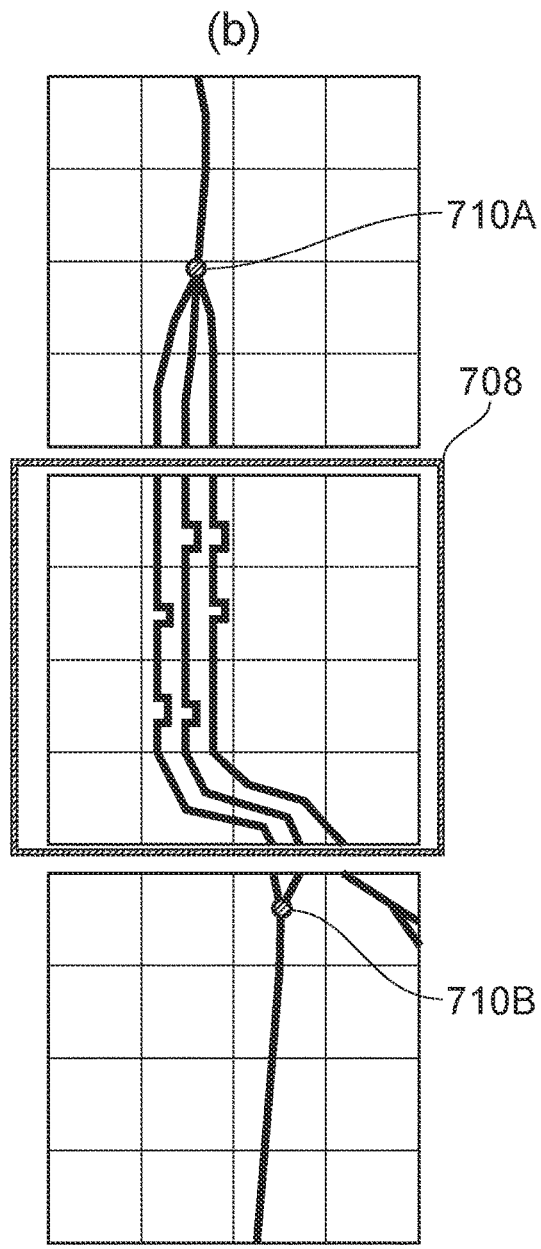

FIGS. 7A-B, 8A-B, 9A-B and 10 illustrate a further technique that may be used to ensure good connectivity, particularly in areas comprising a high concentration of paths where it may be important to consider the existence of network junctions that define places to switch paths. As illustrated in FIG. 7A, the cheapest paths across a series of vector tiles have been identified, where many of the lowest cost paths are not connected to the lowest cost path of the adjacent vector tiles. For example, a vector tile 702A is being processed to identify the cheapest paths, with three possible paths 704A-C from edge to edge being identified. However, the nodes of the lowest cost path 704B are not connected to the nodes of the lowest cost paths 706A, 706B on the adjacent tiles 702B, 702C. Based on this, the paths connected to those identified as the lowest cost paths will also need be taken into consideration to maintain connectivity and cannot be disregarded until the surrounding tiles have been processed. At this stage, there is insufficient information to discard the remaining paths and maintain network connectivity without considering junctions 710A, 710B, as shown in FIG. 7B. This can be resolved by preserving all paths lacking junctions in the neighbouring tiles to maintain full connectivity across the vector tiles. Path junctions in adjacent tiles are maintained until they too can be reduced, when they are no longer on a tile edge or serving a cheapest path route. Therefore, all of the paths within the group of vector tiles denoted 708 will be maintained as candidates as the lowest cost path across each respective vector tile at this particular zoom level.

Figure 9B:
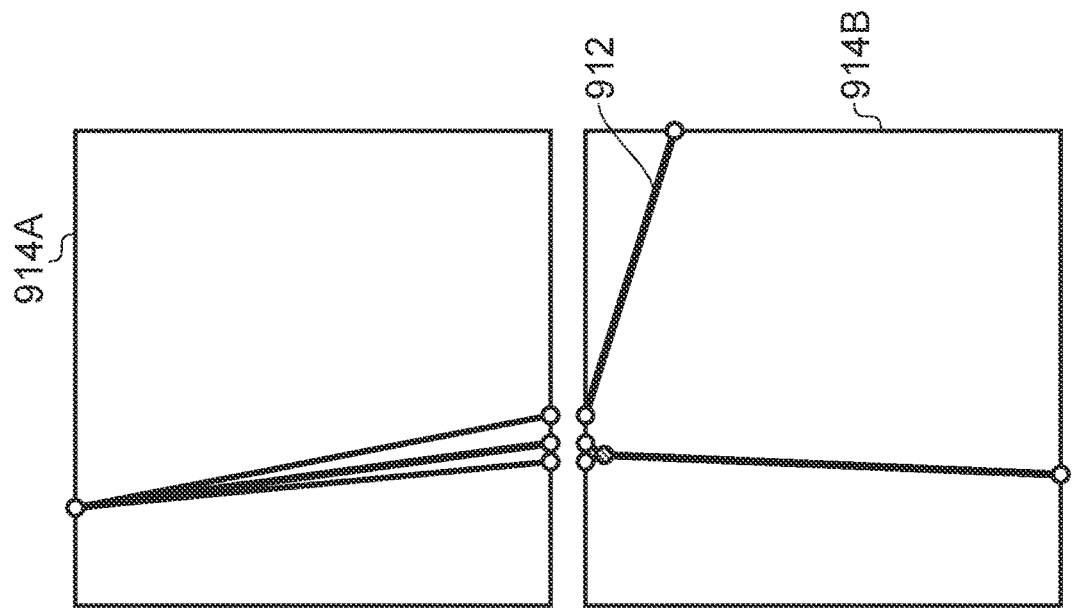
FIGS. 9A-9B illustrate a further example of the processing described herein.
Figure 9A:
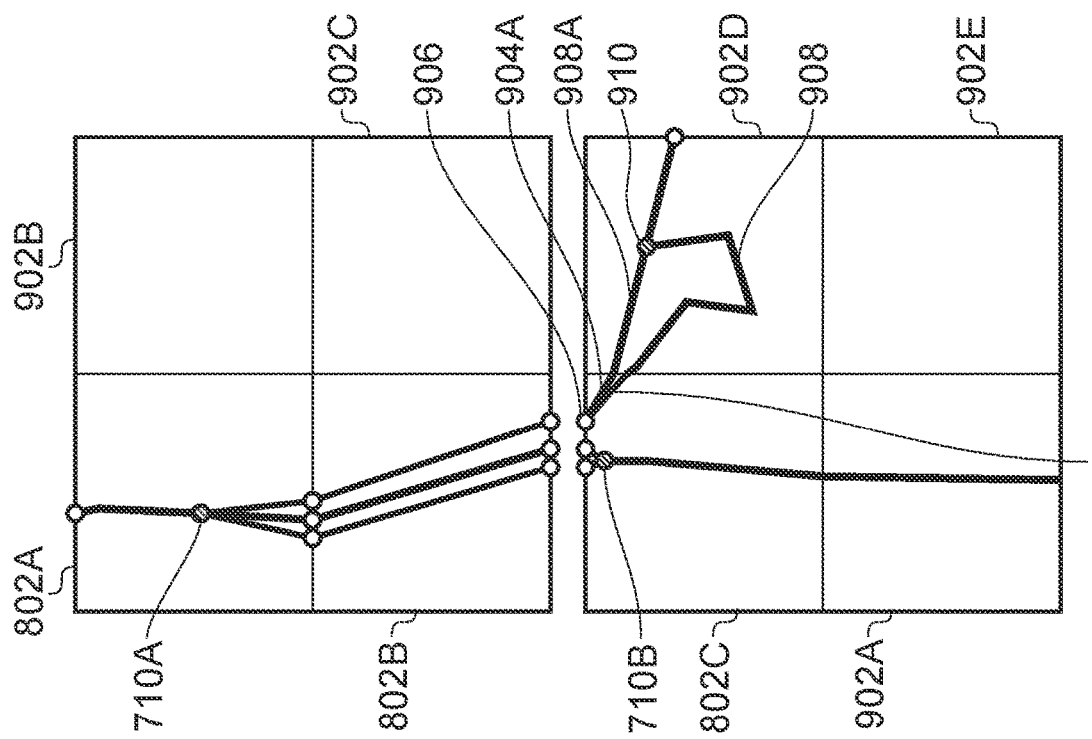
Figure 10:
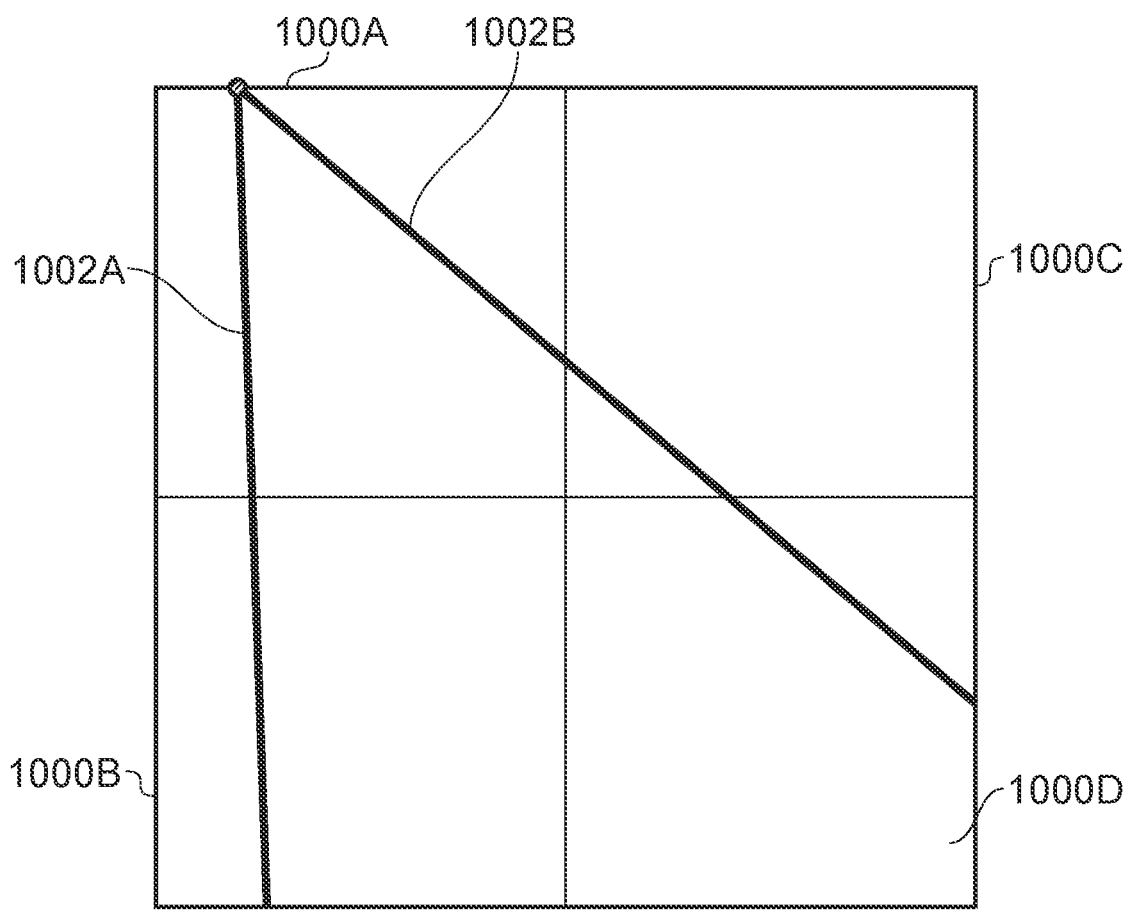
FIG. 10 illustrates another example of the processing described herein.
Figure 11:
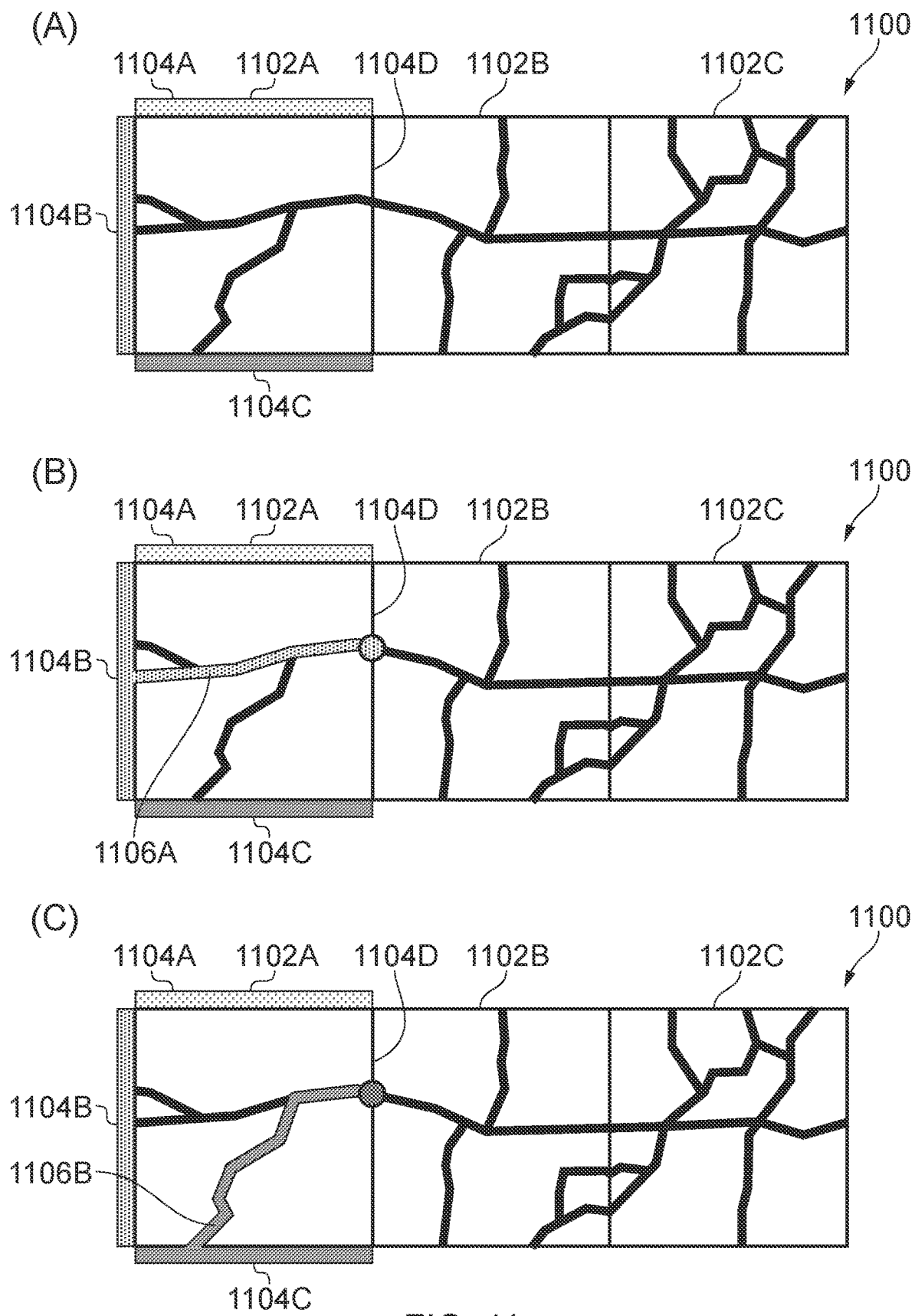
FIG. 11 illustrates another example of the processing described herein.

As shown in FIG. 8A, the path geometries have been generalised and aggregated together to reduce the vector tiles by a factor of 4, with all paths still being maintained as cheapest path candidates. As there is still not enough information to identify the cheapest path across each vector tile, the vector tiles are again reduced by a factor of 4, with the paths being generalised and aggregated together once more to three vector tiles 802A-C, as shown in FIG. 8B. Before any paths can be eliminated and/or generalised further, the preferred paths of the adjacent vector tiles 902A-E, as shown in FIG. 9A, are now considered to ensure that connectivity between the cheapest routes is maintained. As can be seen from vector tile 902D, the two cheapest paths 904A, 904B extending from node 906 in vector tile 802C are connected to paths 908A, 908B that meet at a junction 910. Consequently, the longer of the routes to this junction 910 defined by paths 904B and 908B can be eliminated, and the route defined by paths 904A and 908A generalised to a single line vector 912, as shown in FIG. 9B. Here the path geometries have been generalised and aggregated together such that vector tiles 802A, 802B, 902B and 902C have been reduced to a single vector tile 914A, and vector tiles 802C, 902A, 902D and 902E have been reduced to a single vector tile 914B. Likewise, the path geometries at this zoom level can be further generalised and aggregated together, as shown in FIG. 10. Here, vector tiles 914A and 914B have been reduced to a single vector tile 1000A, with the paths shown in FIG. 7A-B, 8A-B and 9A-B now having been reduced to two single line vectors 1002A, 1002B representative of the two cheapest paths across vector tile 1002A that maintain connectivity with the cheapest paths of the nearby vector tiles 1000B-C.

As such, the parallel roads have been simplified to a state where junctions in the neighbouring vector tiles provide sufficient information to enable data reduction, that is, to eliminate one or more of the paths.

In the examples described above, routing in only one particular direction (e.g. north to south) has been considered for exemplary purposes. However, for any given tile edge, the connectivity to all other edges is fundamental to maintaining a connected network during aggregation. Therefore, it is important to ensure that for any given tile, routing is carried out between all edges and that the preferred paths of neighbouring vector tiles are considered, taking junctions and polygon features into account where applicable.

FIGS. 11-14 illustrate an example of a sweep operation by which the connectivity from edge to edge is analysed and the cheapest paths identified. Starting with FIG. 11, a geographic area 1100 represented by three adjacent vector tiles 1102A-C is shown, wherein the candidate cheapest paths have already been identified and their geometries generalised. The first vector tile 1102A is processed to identify the cheapest paths from edges 1104A-1104C to the edge 1104D that is shared with the adjacent vector tile 1102B. As shown at step (A), there are no paths extending from edge 1104A to edge 1104D. As shown in steps (B) and (C), a first cheapest path 1106A extending from edge 1104B to edge 1104D is identified, and a second cheapest path 1106B extending from edge 1104B to edge 1104D is identified. These paths 1106A, 1106B will thus be maintained as the cheapest paths across the first vector tile 1102A.

Figure 13:
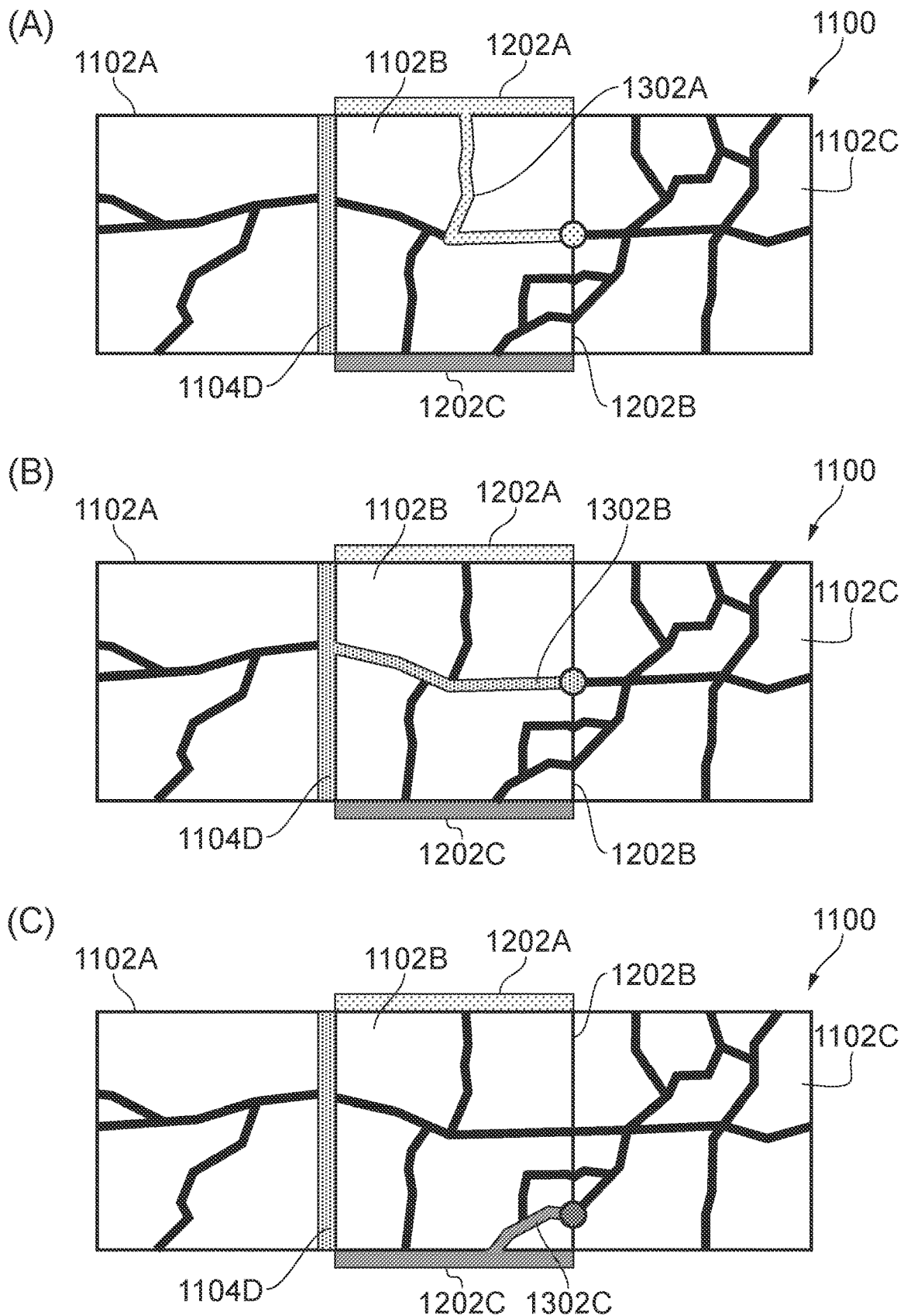
FIG. 13 further illustrates an example of the processing described herein.

Now the paths across the second vector tile 1102B are considered, starting with those originating at shared edge 1104D, as illustrated by FIG. 12. Here, a first cheapest path 1204A extending from edge 1104D to edge 1202A is identified at step (A), a second cheapest path 1204B extending from edge 1104D to edge 1202B is identified at step (B), and a third cheapest path 1204C extending from edge 1104D to edge 1202C is identified at step (C). Next, the cheapest paths from edges 1104D, 1202A and 1202C to the edge 1202B that is shared with the next adjacent vector tile 1102C are identified, as illustrated in FIG. 13. Here, a fourth cheapest path 1302A extending from edge 1202A to edge 1202B is identified at step (A), a fifth cheapest path 1302B extending from edge 1104D to edge 1202B is identified at step (B), and a sixth cheapest path 1302C extending from edge 1202C to edge 1202B is identified at step (C). These paths 1204A-C and 1302A-C will thus be maintained as the cheapest paths across the second vector tile 1102B.

Figure 14:
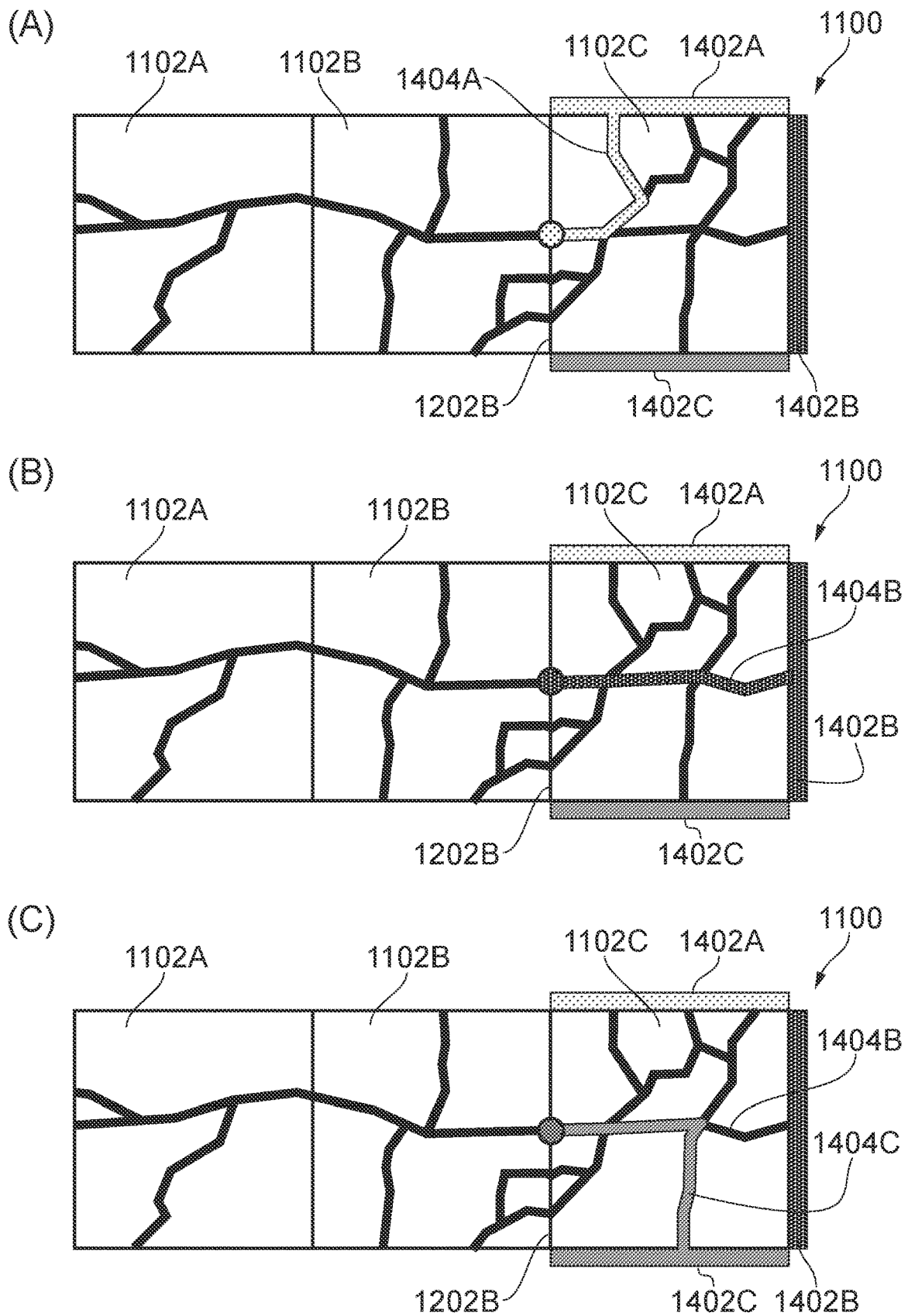
FIG. 14 further illustrates an example of the processing described herein.

Finally, the third vector tile 1102C is processed to identify the cheapest paths from edge 1202B to the remaining edges 1402A-C, as shown in FIG. 14. Here, a first cheapest path 1404A extending from edge 1202B to edge 1402A is identified at step (A), a second cheapest path 1404B extending from edge 1202B to edge 1402B is identified at step (A), and a third cheapest path 1404C extending from edge 1104D1202B to edge 1402C is identified at step (A). These paths 1404A-C will thus be maintained as the cheapest paths across the third vector tile 1102C.

It will be appreciated that each of the vector tiles 1102A-C and each of the edges within those tiles may be processed sequentially, or preferably in parallel.

Figure 15:
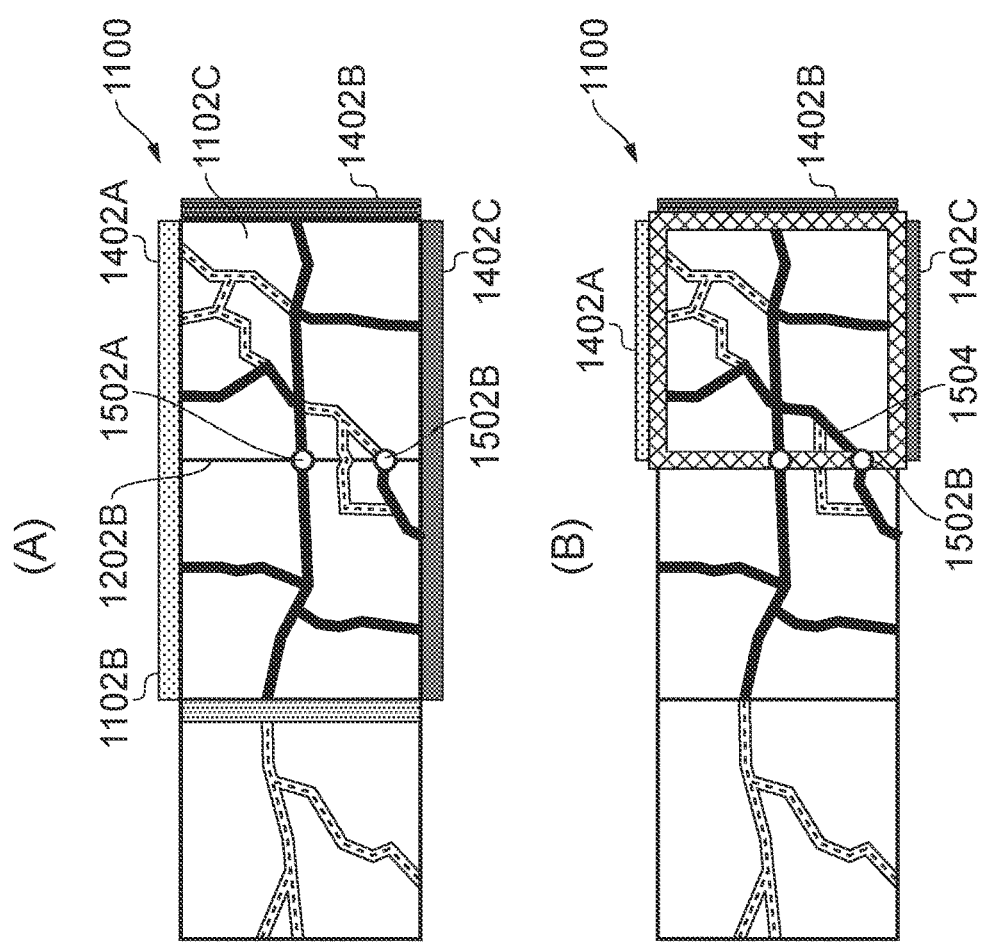
FIG. 15 further illustrates an example of the processing described herein.

Once the cheapest paths have been identified, further sweep operations may then be required to ensure connectivity with neighbouring vector tiles. As shown in FIG. 15(A), the cheapest paths for the second and third vector tiles 1102B and 1102C have been identified, with the cheapest paths in the second vector tile 1102B specifying two nodes 1502A and 1502B at the connecting edge 1202B. The first node 1502A is already connected to one or more of the cheapest paths in the third vector tile 1102C, and so no further processing is required since this node 1502A achieves full connectivity with the other edges 1402A-C of the third vector tile 1102C. However, the second node 1502B is not connected to any of the cheapest paths identified for the third vector tile 1102C, and so a further sweep of this tile 1102C is required to identify an additional cheapest path 1504 to establish connectivity with the other edges 1402A-C, as shown in FIG. 15(B).

Figure 16:
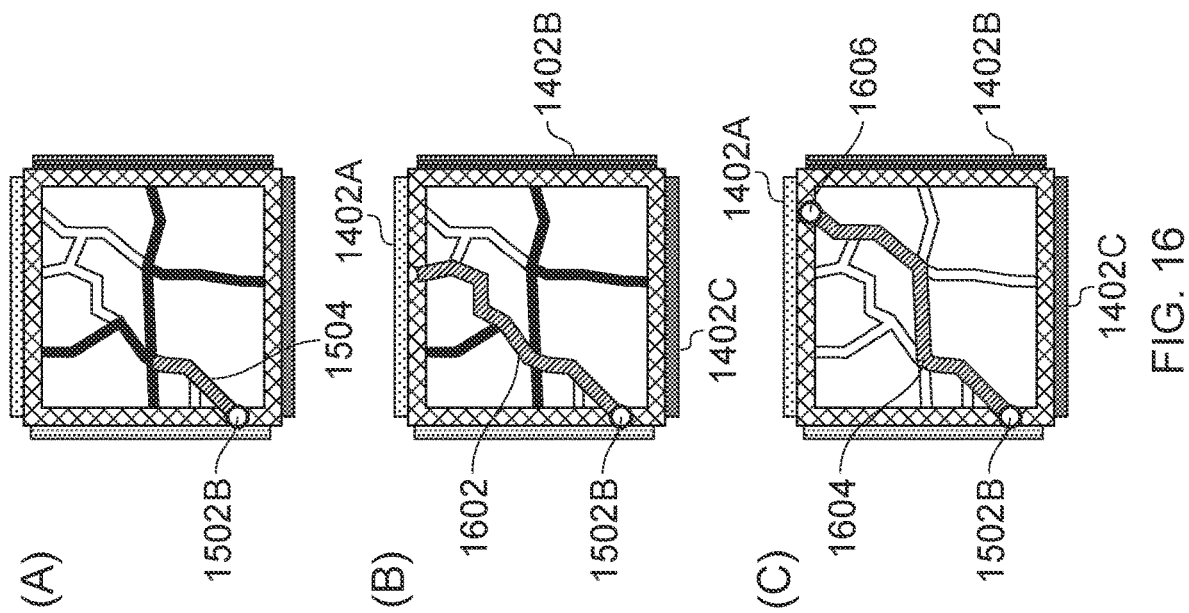
FIG. 16 further illustrates an example of the processing described herein.

There are a number of different ways that the above reconnection may be carried out, as illustrated by FIGS. 16(A)-(C). FIG. 16(A) corresponds to a method of "cheapest reconnection", as implemented in the example of FIG. 15(B), whereby the node 1502B is connected onto the cheapest paths that were initially specified in the sweep operation in the cheapest way possible, that is, by identifying the cheapest possible path that will connect the node 1502B to the existing cheapest paths.

An alternative strategy is one of "selfish reconnection", illustrated by FIG. 16(B), which establishes the cheapest path 1602 from the node 1502B to one of the other edges 1402A-C, without consideration of the connectivity with the cheapest paths in the neighbouring tiles. It will be appreciated however that a sweep operation of the neighbouring tile may then be required to preserve connectivity to the chosen path 1602.

A further strategy is one of "selfless reconnection", illustrated by FIG. 16(C), which establishes the cheapest path 1604 from the node 1502B to one of the other edges 1402A-C, with consideration of the connectivity with the cheapest paths in the neighbouring tiles. In this case, it is found that path 1604 connects with a cheapest path in the neighbouring tile (not shown) that shares the edge 1402A. In doing so, a new node 1606 is identified, in which case the connectivity of this node to other edges 1404B-C within the vector tile will also need to be assessed.

Once the sweep operations have been concluded such that the cheapest paths have been calculated with connectivity between all of the relevant nodes, the remaining data can be discarded from that zoom level. That is to say, all other routes may be disregarded such that they are not propagated to the next zoom level.

The methods described above all seek to identify the cheapest routes from edge to edge, and the aggregated cost to cross entire vector tiles enables rapid high level routing across vast datasets (i.e. vast geographic distances). In this respect, the attributes of a route between two edges of a vector tile can be summed so that the route may be easily stored, for example, as coordinates with the appropriate attributes needed for later calculations.

As demonstrated above, there may be multiple routes between two edges, which may have substantially the same or varying costs. For paths with substantially the same costs, an example may be two roads that have the same distance, or two roads that have varying distances and speed limits such that the average time to travel along each road is the same. For paths with different costs, it may simply be two roads with different distances. In any case, where there are multiple possible paths between two edges, all entry and exit nodes on the tile edges need to be considered, as will now be described with reference to FIGS. 17A-E.

FIG. 17A shows a first geographic area 1700 represented by a vector tile 1702, the vector tile 1702 comprising a number of possible routes from top to bottom. To identify the cheapest paths, the nodes A and B intersecting the top edge 1704A are identified as candidates for the route source, and the nodes 1, 2 and 3 intersecting the bottom edge 1704B are identified as candidates for the route destination, as illustrated by the FIG. 17B. It will of course be appreciated that the nodes A and B on the top edge 1704A may also be the route destination, and the nodes 1, 2 and 3 on the bottom edge 1704B could also be the route source.

Figure 17D:
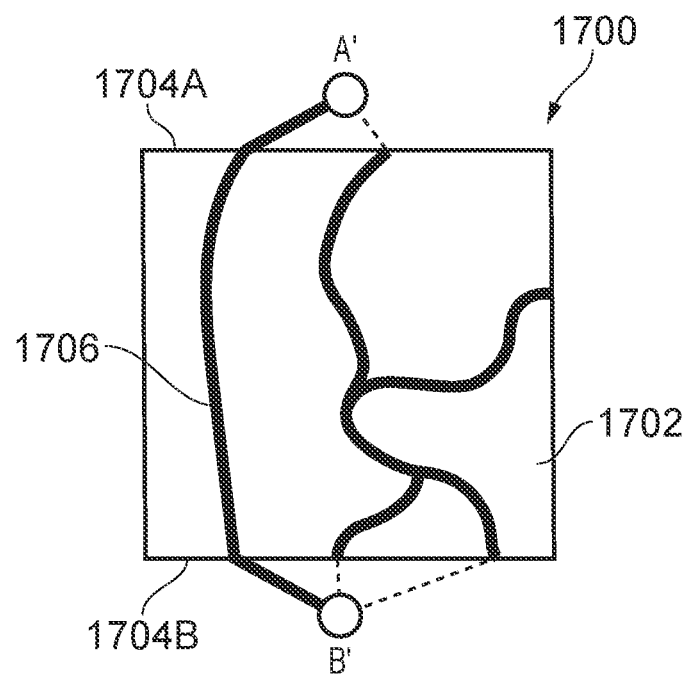
Figure 17E:
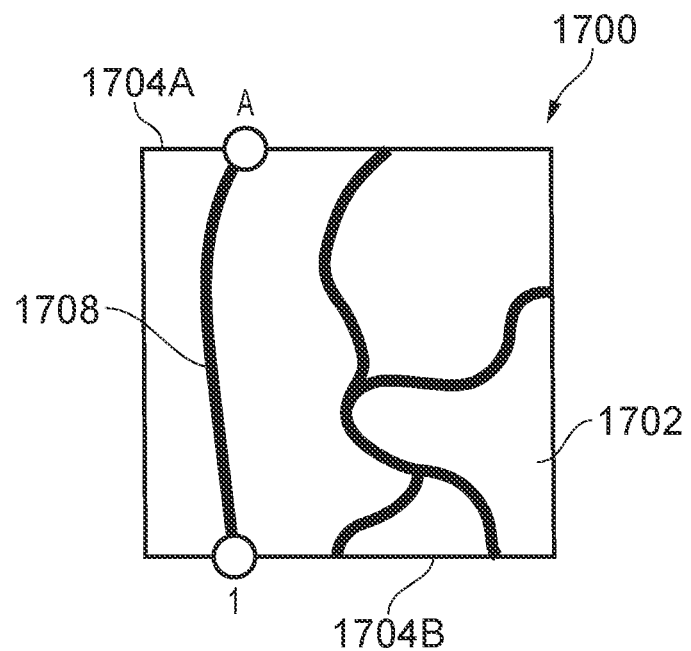

To reduce the complexity caused by the number of source and destination nodes, of which there may be many more than those shown in the present example, pseudo nodes A' and B' are introduced, as shown in FIG. 17C. The pseudo nodes A' and B' are located such that there is an equal cost to each of the respective tile nodes. For example, pseudo node A' has an equal cost to each of nodes A, B and C on top edge 1704A, and pseudo node B' has an equal cost to each of nodes 1, 2 and 3 on bottom edge 1704B. As illustrated by FIG. 17D, these pseudo nodes A' and B' provide a single source and destination that will reveal a lowest cost route 1706 between the two pseudo nodes A' and B', whilst considering all of the nodes on the tile edge. The pseudo nodes A' and B' can then be removed, as shown in FIG. 17E, to identify the actual lowest cost route 1708 from the top edge 1704A to the bottom edge 1704B as being that between nodes A and 1.

As discussed above, the topographic data is processed such that a plurality of zoom levels are generated to produce a vector tile pyramid, wherein each zoom level of the pyramid comprises a plurality of vector tiles representative of the same geographic area at different levels of detail. The zoom level at the bottom of the pyramid comprises a larger number of vector tiles, which are all at the highest level of detail. For example, this zoom level may contain all of the source topographic data. Each subsequent zoom level is of decreasing resolution, with the zoom level at the top of the pyramid comprising the least number of vector tiles at the lowest level of detail. As discussed above, the vector tiles of each zoom level have been processed to identify the cheapest routes from edge to edge, and so the lower resolution vector tiles at the top of the pyramid can be used in the first instance to establish and locate a route between the start and end locations, before then drilling down into the relevant higher resolution vector tiles to identify the cheapest route. As only a small number of vector tiles need to be resolved in the first instance, this quickly determines routes between two geographic locations by reducing the amount of data to be processed, particularly for routes across large geographic distances, including those over thousands of kilometres in length (e.g. across the United States of America).

Figure 18:
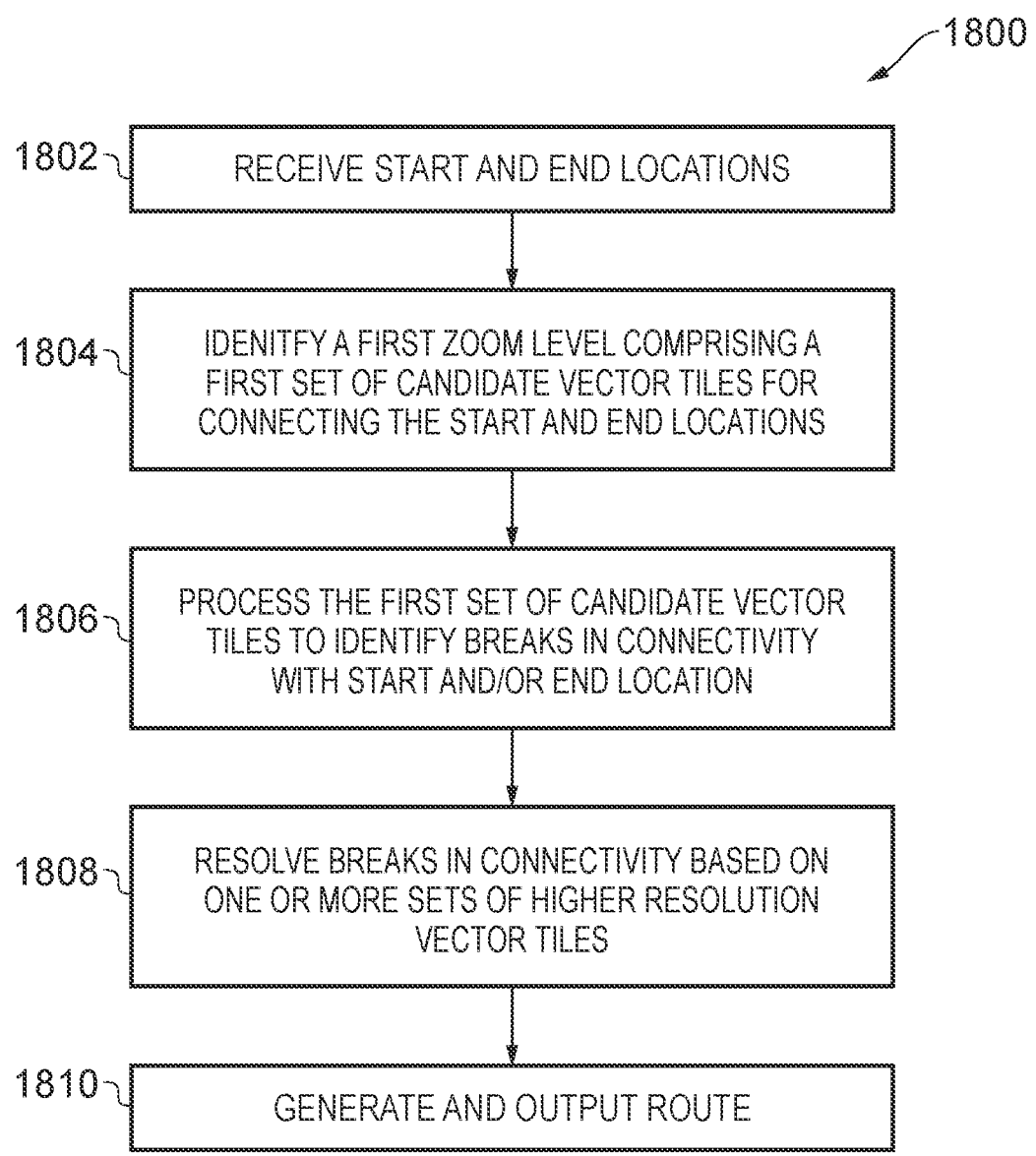
FIG. 18 is a flow diagram illustrating a method of route generation one or more illustrative aspects described herein.

FIG. 18 shows a method 1800 of route generation using the zoom levels generated in accordance with one or more illustrative aspects described herein.

To begin, a start and end location is received from a user (step 1802), for example, via the data input port 512 or communications network 513 for input to the route generation program, as described with reference to FIG. 5.

Upon receiving the start and end locations, a first zoom level comprising a first set of candidate vector tiles from connecting the start and end locations is identified (step 1804). In this respect, the first zoom level will be the lowest resolution of vector tiles whereby a single vector tile separates the start and end locations, wherein that intermediate vector tile has entry points in proximity to the start and end locations. That is to say, there is a vector tile between the two locations that has a guaranteed route across the vector tile travelling in the direction of the two locations. The first set of vector tiles may thus include the vector tiles containing the start and end locations, the intermediate vector tile separating the two locations, and any other surrounding tiles that may be required for context.

This first set of vector tiles are then processed to identify any breaks in connectivity between the start and end locations (step 1806). In this respect, there may not be a break in connectivity if the start and/or end locations correspond to the entry points of the intermediate vector tile, in which case only the source topographic data corresponding to that intermediate vector tile needs to be processed further to generate the complete route. However, if the start and/or end locations are within the vector tiles adjacent to the intermediate vector tile, then this will correspond to a break in connectivity that needs resolving before the complete route can be generated.

To resolve the break in connectivity, higher resolution vector tiles corresponding to the vector tiles containing the start and/or end locations are processed to identify a route from the start and/or end locations to the entry points of the intermediate vector tile (step 1808). In this respect, each zoom level will be considered in turn until a path can be identified from the entry point to the target location.

Once the route at the lowest level of resolution has been identified, the topographic data corresponding to the relevant vector tiles is then processed to generate the complete route, which can then be output to the user (step 1810).

A detailed example of the method of route generation will now be described, with reference to FIGS. 19-27.

Figure 19B:
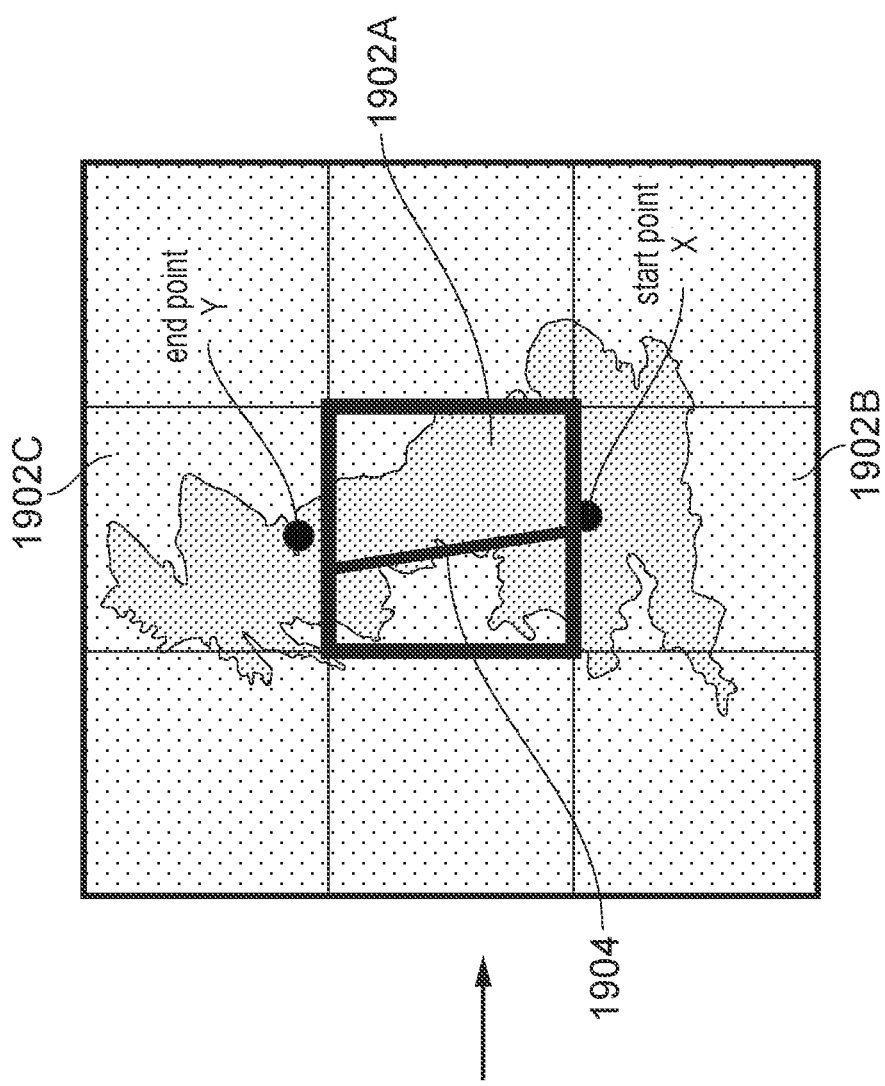
FIGS. 19A-B illustrate an example of the route generation described herein.
Figure 19A:
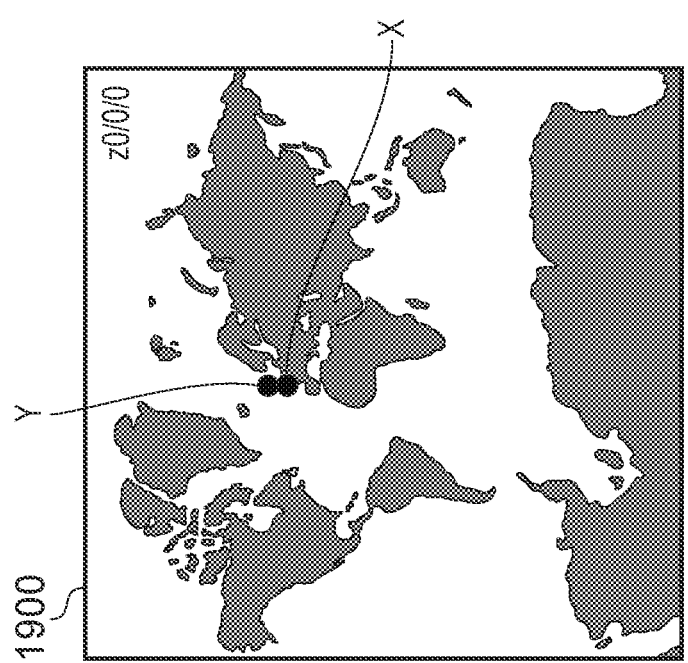

A user inputs a start location, X, and an end location, Y. For example, the start location may be Birmingham and the end location may be Edinburgh. Given the start and end locations, X and Y, a first zoom level is identified, as illustrated by FIGS. 19A-B. This may not necessarily be the lowest resolution zoom level available, z0, as shown in FIG. 19A, since both points are within a single vector tile. As such, the first zoom level may be lower down the pyramid, in this case z6, as shown in FIG. 19B. Here, the start and end locations, X and Y, are separated by a single intermediate vector tile 1902A, with the start and end locations, X and Y, being in the adjacent vector tiles 1902B and 1902C respectively. The intermediate vector tile 1902 has a cheapest route 1904 across the vector tile 1902A in the direction of the two locations, X and Y, i.e. north to south.

The surrounding vector tiles may also be identified for context as they may provide further insight to the routing options available. For example, neighbouring vector tiles may contain a bypass road that avoids a built up area within the intermediate vector tile, and therefore provide a cheaper route between the target locations.

Figure 20B:
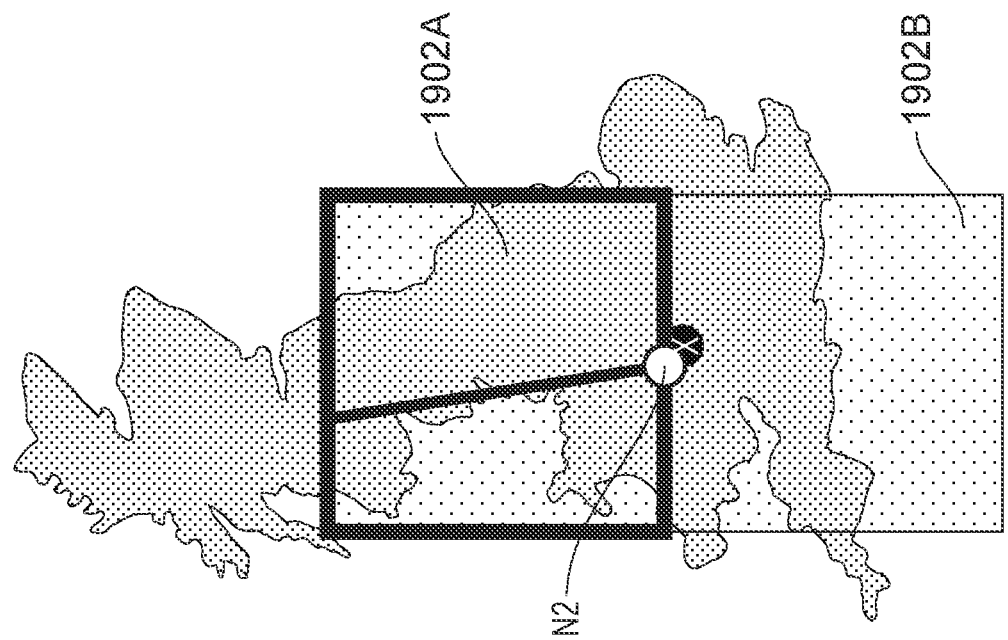
FIGS. 20A-B further illustrate an example of the route generation described herein.
Figure 20A:
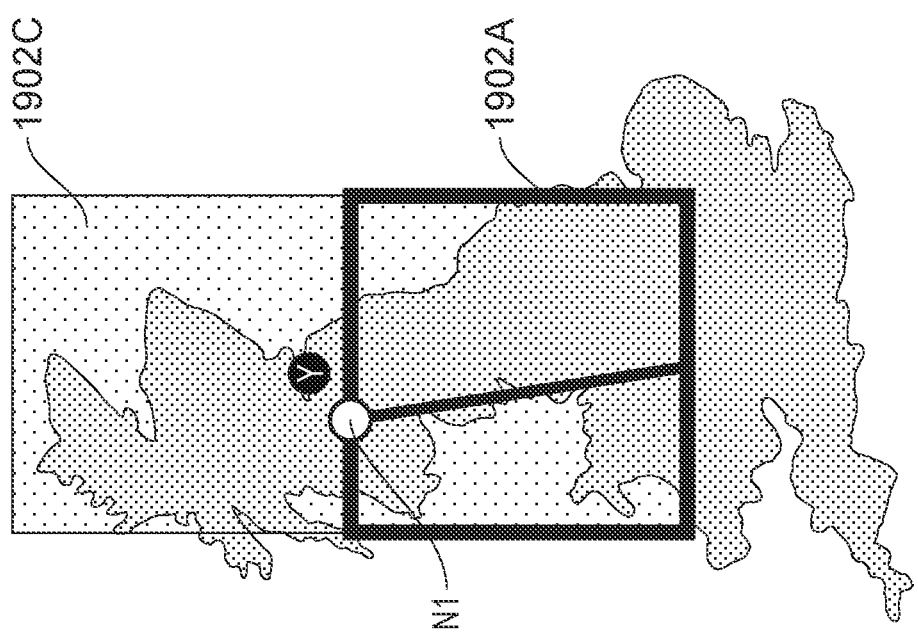

As the start and end locations, X and Y, are within the adjacent vector tiles 1902B and 1902C, the next step is to identify a route between the start and end locations, X and Y, and the entry points of the route 1904 crossing the intermediate vector tile 1902A. As shown in FIGS. 20A-B, these entry points are identified as node N1 and node N2.

These breaks in connectivity must then be resolved, starting with node N1 and the end location Y, which in this example is Edinburgh. To do this, vector tile 1902C containing the end location Y is enlarged by a factor of 4 to the next zoom level z7, as illustrated by FIGS. 21A-B. At this zoom level z7, the geographic area shown in vector tile 1902C is now represented by four higher resolution vector tiles 2100A-D. Here, it can be seen that the node N1 and end location Y are both contained in a single vector tile 2100A, but that this vector tile 2100A still does not give enough information to route between these two points.

Figure 22A:
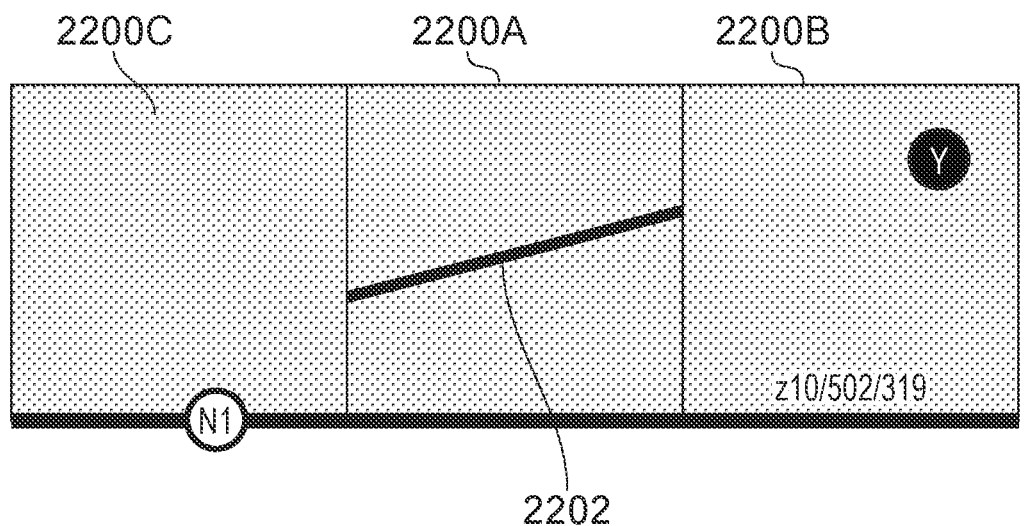
FIGS. 22A-B further illustrate an example of the route generation described herein.
Figure 22B:
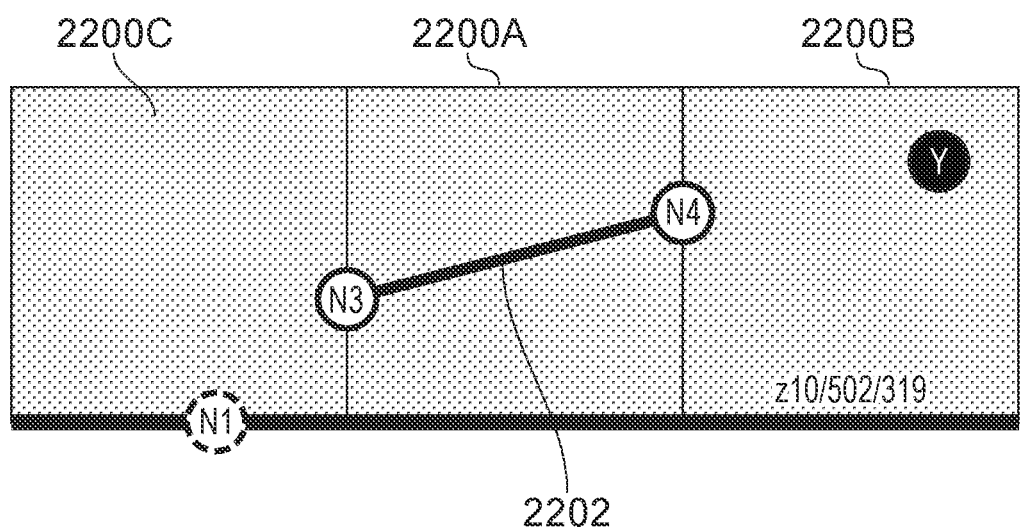

The vector tile 2100A will continue to be enlarged until the two points, N1 and Y, are separated by a single intermediate vector tile 2200A having a known cheapest path 2202 across it travelling in the direction of the two points (east to west in this case), as shown in FIGS. 22A-B. The entry points, nodes N3 and N4, of this path 2202 are then identified to determine the connectivity with the node N1 and end location Y.

Figure 23:
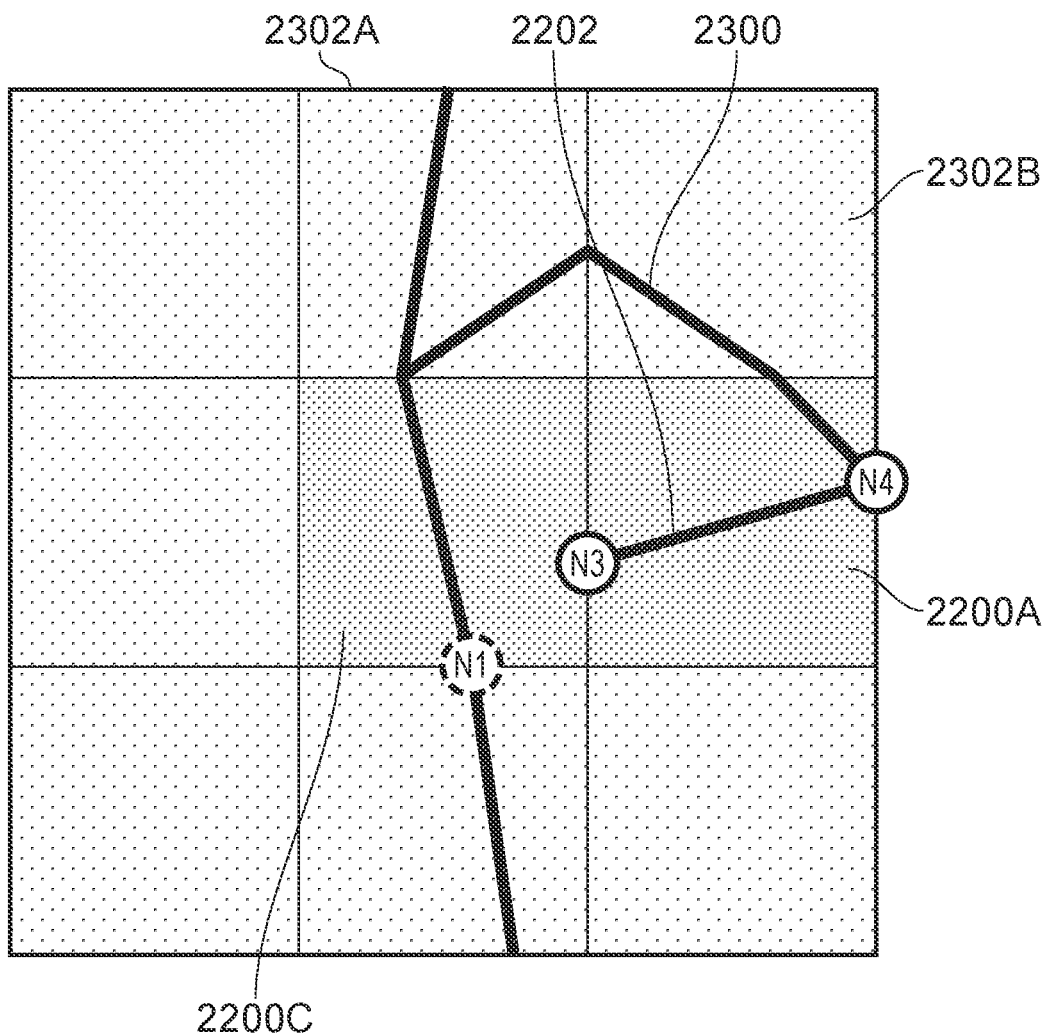
FIG. 23 further illustrates an example of the route generation described herein.

For the node N1, the connectivity with one of the entry points, nodes N3 and N4, should be readily available since any entry points along vector tile edges will be derived from the source topographic data, and thus entry points along the edges of adjacent vector tile are very likely to be connected in some way, even if not directly. This is because the vector tiles have been processed so as to only preserve paths that have connectivity with the adjacent vector tiles, i.e. any nodes on the vector tile edges will be connected to paths in adjacent vector tiles sharing that edge. If there is no connection within the vector tile 2200C itself, the surrounding vector tiles should be evaluated to identify an alternative route 2300, as illustrated by FIG. 23, which in this case actually connects the node N1 directly to the second entry point at node N4 via two additional vector tiles 2302A-B.

Figure 24:
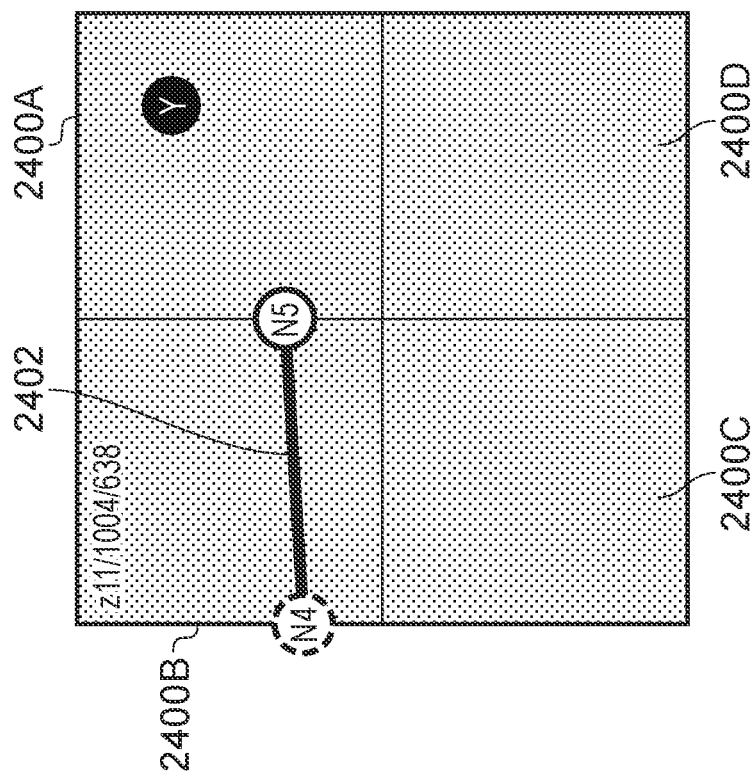
FIG. 24 further illustrates an example of the route generation described herein.

For the end location Y, further processing is required since this location sits within vector tile 2200B, and thus the connectivity is not known at this zoom level, z10. To do this, the next zoom level down, z11, is considered, as illustrated in FIG. 24, with vector tile 2200B being enlarged to four higher resolution vector tiles 2400A-D. There is now an intermediate vector tile 2400B between the end location Y and the second entry point at node N4, wherein the intermediate vector tile 2400B comprises a cheapest path 2402 in the direction of end location Y (i.e. west to east). This path 2402 terminates at a further node N5, which now needs to be connected to the end location Y.

Figure 25:
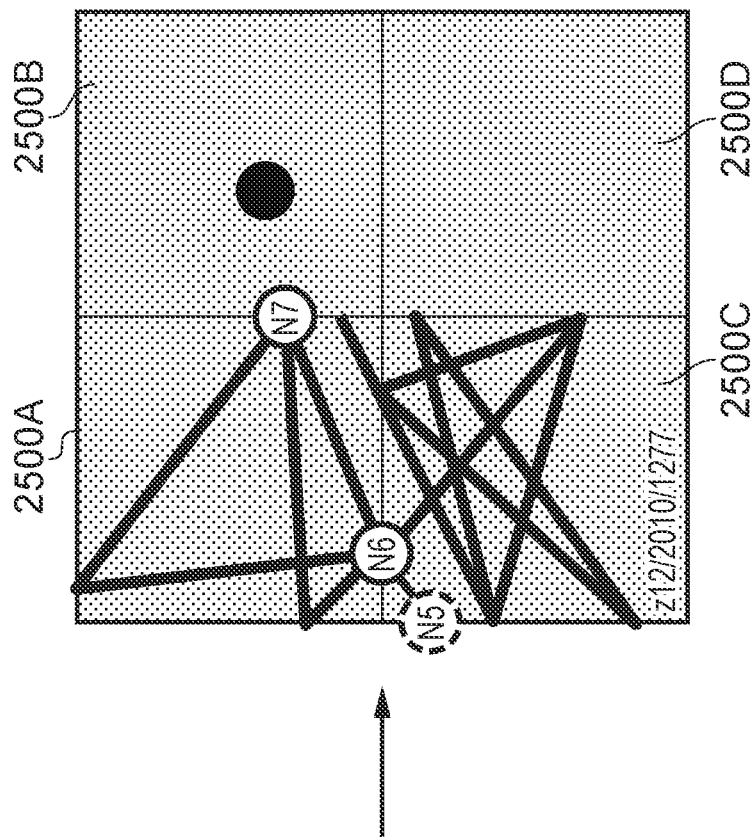
FIG. 25 further illustrates an example of the route generation described herein.

As the end location Y is still within a vector tile 2400A, the next zoom level, z12, needs to be considered, as illustrated by FIG. 25. The same process is then repeated to identify an intermediate vector tile 2500A between the end location Y and node N5, with the connectivity between the vector tile 2500C on which node N5 sits and the intermediate vector tile 2500A being established via nodes N6 and N7, with the cheapest route terminating at node N7.

Figure 26:
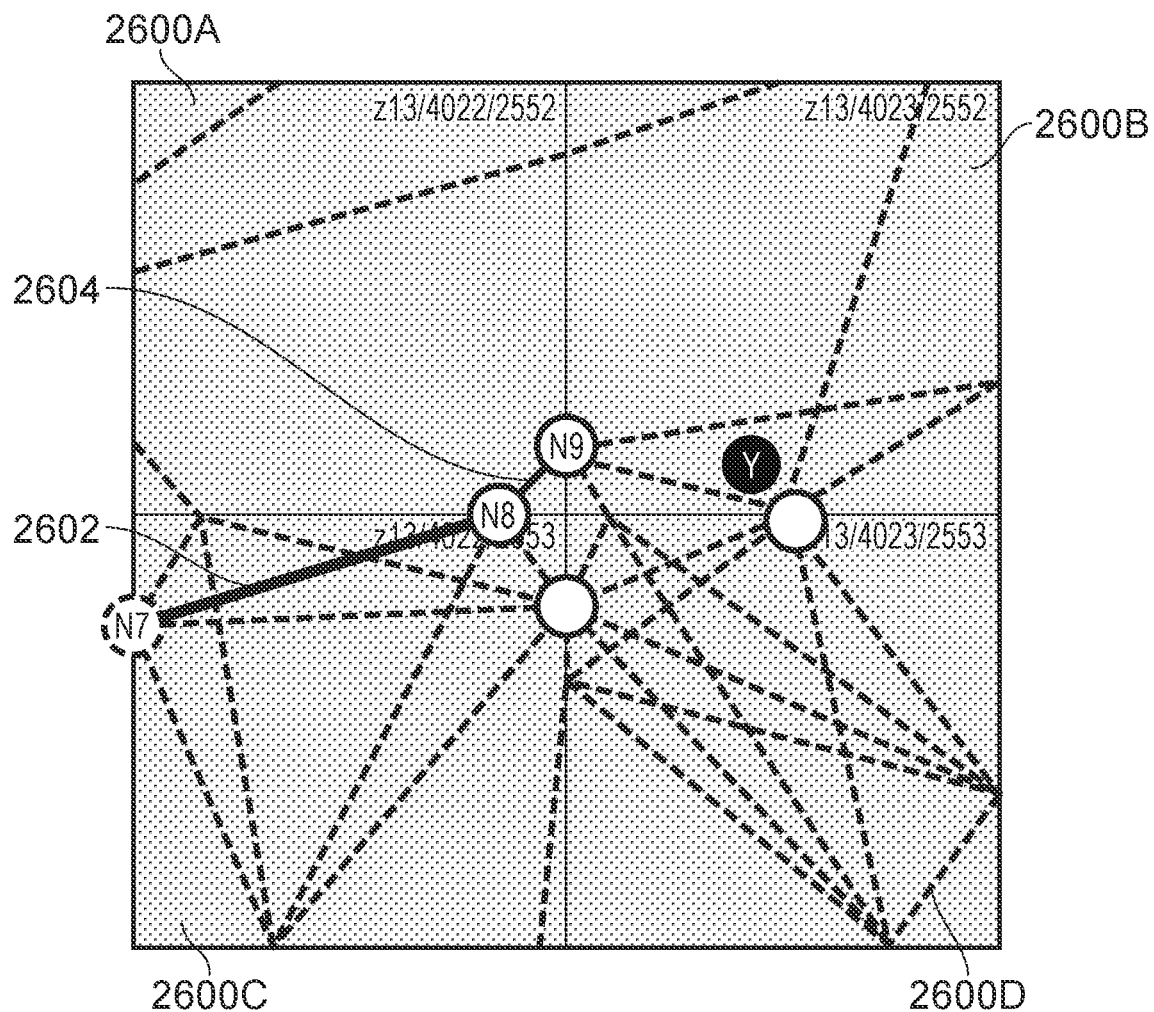
FIG. 26 further illustrates an example of the route generation described herein.

The same process is repeated again at the next zoom level, z13, to connect node N7 to the end location Y, as illustrated by FIG. 26. As before, an intermediate vector tile 2600A between the end location Y and the node N7, with the connectivity between the vector tile 2600C on which node N7 sits and the intermediate vector tile 25600A being established via nodes N8 and N9, with the cheapest route terminating at node N9, denoted by paths 2602 and 2604.

Figure 27:
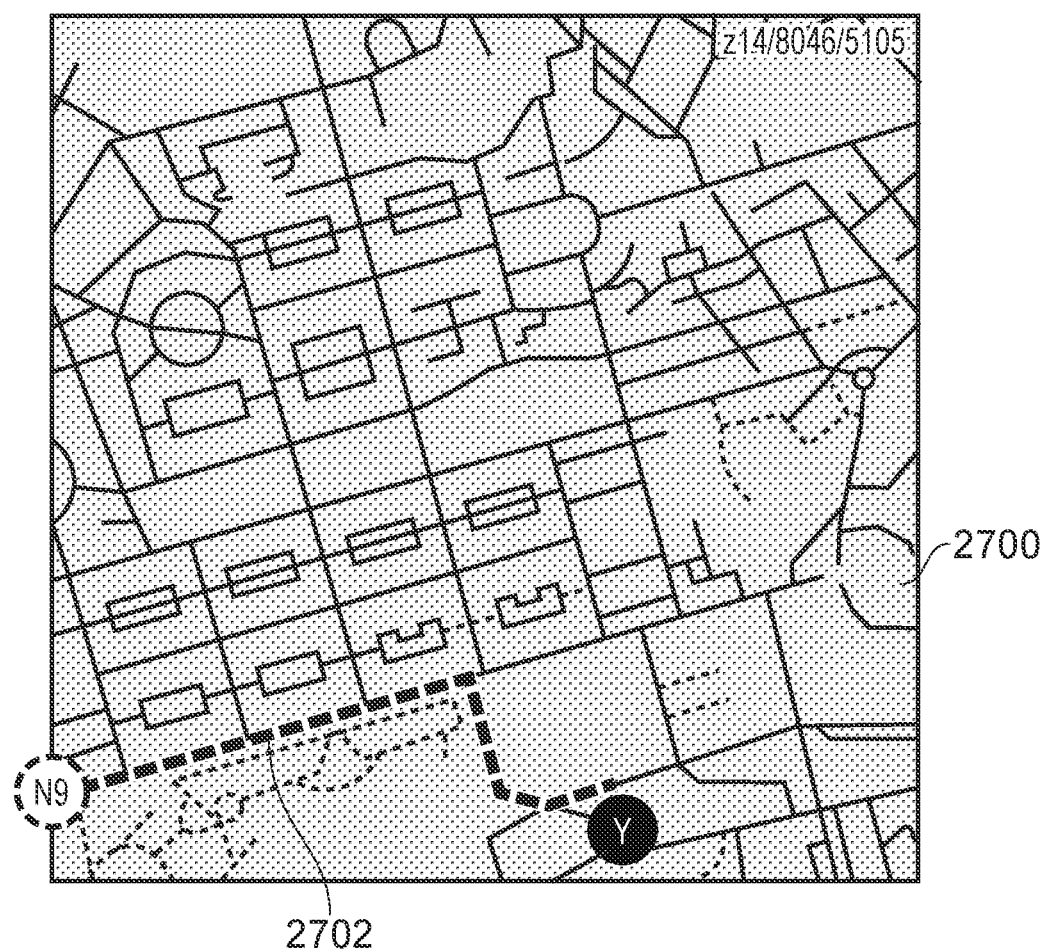
FIG. 27 further illustrates an example of the route generation described herein.

Finally, as shown in FIG. 27, to connect the node N9 to end location Y, the next zoom level, z14, is considered, which in this case relates to the source topographic data, that is to say, this is the highest resolution zoom level. Consequently, the topographic data can then be used to route directly from node N9 to end location Y via a route 2702. It will be appreciated however that in some cases it will not be necessary to zoom down to this level, for example, if the target location is on the edge of a vector tile at a given zoom level, since connectivity of that edge with the adjoining vector tiles will be known from the pre-processing.

Referring back to FIG. 20A, the same process will be performed for connecting node N2 to the start destination, X.

Once the cheapest connection between the start and end points, X and Y, has been established, the route can be refined using the source topographic data to generate and output a detailed geographic route between those two geographic locations to the user, for example, via the display of a user device.

As such, by processing the vector tiles at each zoom level such that the cheapest (e.g. the shortest, quickest and/or safest) paths across each vector tile is established whilst maintaining connectivity with the adjacent vector tiles at that zoom level, the connectivity between two geographic locations can be quickly and efficiently identified without the need to process large amounts of data. In this respect, the majority of the route can be initially established in the first step (1804) using small scale data, with the remainder of the route being established by incrementally zooming into the area surrounding the start and end locations until a connection with those locations is made. It is only once connectivity has been established that the large scale data is used to generate a more detailed route. Furthermore, since the cheapest path across vector tiles at each zoom level are derived from the cheapest path of larger scale zoom levels (i.e. those at higher resolution), once the coarse route at a smaller scale has been established, this can be propagated down quickly through the zoom levels to provide this route at large scale without large amounts of data needing to be processed.

Various modifications, whether by way of addition, deletion and/or substitution, may be made to all of the above described embodiments to provide further embodiments, any and/or all of which are intended to be encompassed by the appended claims.

For example, whilst the above describes vector tile in the geographic space, the vector tiles may also be represented as a graph, with the tile nodes and edges being assigned a unique ID. In this respect, the topographic dataset may be a set of data points within each vector tile that construct a graph.

Similarly, it will be appreciated by a person skilled in the art that the methods described herein may be implemented in both two and three-dimensions. That is to say, the vector tiles, vector features and resulting line vectors may be two or three dimensional. For example, a vector feature representative of a flight of stairs, an escalator or a ramp may be generalised to a line vector with x, y and z components. As a result, the connectivity between vector tiles in the z direction may also be taken into consideration when determining the cheapest routes across vector tiles. This can be particularly useful when routing within large buildings or structures such as underground systems. For example, the quickest route between a several tiles may actually be a walkway or road through an underground tunnel, such as those passing below a river. This is also particularly important when processing junctions, which often have roads at different levels passing over one another. For example, two roads may have the same x and y component at a tile edge, thus appearing to relate to the same node, however, if they are on two different levels of a junction, they will have a different z component and therefore do not connect.

The invention claimed is:

1. A computer-implemented method of generalising topographic data for use in route generation, the method comprising:
   (i) obtaining a first topographic dataset relating to a geographical area, wherein the first topographic dataset comprises a first set of vector tiles at a first zoom level, each vector tile comprising a plurality of vector features having a geometry and one or more attributes associated therewith;
   (ii) generating a first set of line vectors for the first set of vector tiles based on the geometry and attributes of one or more of the vector features of the first topographic dataset, wherein each line vector of the first set of line vectors extends between two edges of a vector tile of the first zoom level and is connected to at least one line vector of an adjacent vector tile, wherein generating the first set of line vectors comprises determining a set of cheapest routes across each respective vector tile, wherein a cheapest route corresponds to one or more of: a shortest route, a fastest route and a safest route;
   (iii) generating a second topographic dataset relating the geographical area comprising a second set of vector tiles at a second zoom level of a smaller scale by applying a transformation function to the first set of vector tiles, wherein the transformation function generalises a first number of vector tiles in the first set of vector tiles to generate a single vector tile in the second set of vector tiles, and wherein the second set of vector tiles comprises the first set of line vectors; and
   (iv) generating a second set of line vectors for the second set of vector tiles from the first set of line vectors, wherein each line vector of the second set of line vectors extends between two edges of a vector tile of the second zoom level and is connected to at least one line vector of an adjacent vector tile.

2. The method according to claim 1, further comprising generating a plurality of further topographic datasets relating to the geographic area, wherein each further topographic dataset comprises a new set of vector tiles at a new zoom level of reducing scale, and wherein each further topographic dataset is generated according to steps (ii) and (iii).

3. The method according to claim 1, wherein generating the first set of line vectors comprises identifying one or more vector features for each vector tile based on the one or more attributes associated therewith, wherein the identified vector features provide a candidate route for crossing the respective vector tile.

4. The method according to claim 3, further comprising generalising the geometry of the identified vector features to a plurality of line vectors.

5. The method according to claim 1, wherein determining the set of cheapest routes comprises identifying a line vector between respective edges of a vector tile providing the cheapest route between said edges.

6. The method according to claim 1, wherein determining the set of cheapest routes across each respective vector tile comprises determining a connection with a cheapest route of an adjacent vector tile such that the pair of adjacent vector tiles are connected by a line vector.

7. A computer-implemented method of generating a route between a first geographic position and a second geographic position, comprising:
   providing a plurality of topographic datasets, wherein each topographic dataset comprises a set of vector tiles at a different zoom level, each set of vector tiles comprising a set of line vectors, and wherein each line vector extends between two edges of a vector tile and is connected to at least one line vector of an adjacent vector tile;
   identifying a first zoom level comprising a first set of candidate vector tiles for connecting the first and second geographic positions;
   identifying one or more further candidate vector tiles from one or more further zoom levels, wherein the further candidate vector tiles correspond to at least a portion of the first set of candidate vector tiles at a larger scale;
   processing the first set of candidate vector tiles to determine a first route between the first and second geographic positions, the first route comprising one or more line vectors of the first set of candidate tiles;
   processing the one or more further candidate vector tiles to determine one or more further portions of the first route between the first and second geographic positions, the one or more further portions of the first route comprising one or more line vectors of the further candidate vector tiles; and
   generating a final route between the first and second geographic positions in dependence on the determined first route and the one or more further portions of the first route.

8. The method according to claim 7, wherein the first set of candidate vector tiles for connecting the first and second geographic positions are such that the first and second geographic positions are separated by a single intermediate vector tile having a first line vector extending in a direction of the first and second geographic positions, the first and second geographic positions being each within a vector tile adjacent to the intermediate vector tile.

9. The method according to claim 8, further comprising:
   connecting the first line vector with the first and/or second geographic positions based on the one or more further candidate vector tiles, such that the first and second geographic positions are connected by the first line vector and one or more further line vectors.

10. The method according to claim 7, wherein the plurality of topographic datasets are generated by:
   (i) obtaining a first topographic dataset relating to a geographical area, wherein the first topographic dataset comprises a first set of vector tiles at a first zoom level, each vector tile comprising a plurality of vector features having a geometry and one or more attributes associated therewith;
   (ii) generating a first set of line vectors for the first set of vector tiles based on the geometry and attributes of one or more of the vector features of the first topographic dataset, wherein each line vector of the first set of line vectors extends between two edges of a vector tile of the first zoom level and is connected to at least one line vector of an adjacent vector tile, wherein generating the first set of line vectors comprises determining a set of cheapest routes across each respective vector tile, wherein a cheapest route corresponds to one or more of: a shortest route, a fastest route and a safest route; and (iii) generating a second topographic data set relating the geographical area comprising a second set of vector tiles at a second zoom level of a smaller scale by applying a transformation function to the first set of vector tiles, wherein the transformation function generalises a first number of vector tiles in the first set of vector tiles to generate a single vector tile in the second set of vector tiles, and wherein the second set of vector tiles comprises the first set of line vectors.

11. A system comprising:

a processor; and one or more computer readable media storing computer readable instructions which, when executed by the processor, configure the system to:

obtain a first topographic dataset relating to a geographical area, wherein the first topographic dataset comprises a first set of vector tiles at a first zoom level, each vector tile comprising a plurality of vector features having a geometry and one or more attributes associated therewith;

generate a first set of line vectors for the first set of vector tiles based on the geometry and attributes of one or more of the vector features of the first topographic dataset, wherein each line vector of the first set of line vectors extends between two edges of a vector tile of the first zoom level and is connected to at least one line vector of an adjacent vector tile, wherein generating the first set of line vectors comprises determining a set of cheapest routes across each respective vector tile, wherein a cheapest route corresponds to one or more of: a shortest route, a fastest route and a safest route;

generate a second topographic dataset relating the geographical area comprising a second set of vector tiles at a second zoom level of a smaller scale by applying a transformation function to the first set of vector tiles, wherein the transformation function generalises a first number of vector tiles in the first set of vector tiles to generate a single vector tile in the second set of vector tiles, and wherein the second set of vector tiles comprises the first set of line vectors; and generate a second set of line vectors for the second set of vector tiles from the first set of line vectors, wherein each line vector of the second set of line vectors extends between two edges of a vector tile of the second zoom level and is connected to at least one line vector of an adjacent vector tile.

12. The system according to claim 11, wherein the processor is caused to generate the first set of line vectors by identifying one or more vector features for each vector tile based on the one or more attributes associated therewith, wherein the identified vector features provide a candidate route for crossing the respective vector tile.

13. The system according to claim 12, wherein the processor is further caused to generalise the geometry of the identified vector features to a plurality of line vectors.

14. The system according to claim 11, wherein the processor is caused to determine the set of cheapest routes by:

identifying a line vector between respective edges of a vector tile providing the cheapest route between said edges; and determining a connection with a cheapest route of an adjacent vector tile such that the pair of adjacent vector tiles are connected by a line vector.

* * * * *